(12) United States Patent
Umebayashi et al.

(10) Patent No.: US 8,128,843 B2
(45) Date of Patent: *Mar. 6, 2012

(54) PHOTOCURABLE COMPOSITION, PHOTOCURABLE INK COMPOSITION, PROCESS FOR PRODUCING PHOTOCURED MATERIAL, AND INKJET RECORDING METHOD

(75) Inventors: Tsutomu Umebayashi, Ashigarakami-gun (JP); Ippei Nakamura, Ashigarakami-gun (JP); Tokihiko Matsumura, Ashigarakami-gun (JP)

(73) Assignee: Fujifilm Corporation, Tokyo (JP)

( * ) Notice: Subject to any disclaimer, the term of this patent is extended or adjusted under 35 U.S.C. 154(b) by 510 days.

This patent is subject to a terminal disclaimer.

(21) Appl. No.: 12/353,500

(22) Filed: Jan. 14, 2009

(65) Prior Publication Data

US 2009/0186163 A1 Jul. 23, 2009

(30) Foreign Application Priority Data

Jan. 22, 2008 (JP) ................................. 2008-011720

(51) Int. Cl.
 *H01B 1/12* (2006.01)
 *C08J 7/04* (2006.01)
 *B41M 5/28* (2006.01)

(52) U.S. Cl. ............. 252/500; 427/511; 522/53; 522/63
(58) Field of Classification Search .................. 252/500; 427/511; 522/53, 63
See application file for complete search history.

(56) References Cited

U.S. PATENT DOCUMENTS

| | | | |
|---|---|---|---|
| 4,134,813 A | | 1/1979 | Kuesters et al. |
| 4,318,791 A | * | 3/1982 | Felder et al. .................... 522/33 |
| 2006/0025498 A1 | | 2/2006 | Fukushige et al. |
| 2008/0131618 A1 | * | 6/2008 | Nakamura et al. ............. 427/511 |
| 2008/0182031 A1 | * | 7/2008 | Matsumura et al. ........... 427/519 |
| 2010/0129565 A1 | * | 5/2010 | Matsumura .................... 427/553 |
| 2011/0123929 A1 | * | 5/2011 | Fujita et al. ................ 430/281.1 |

FOREIGN PATENT DOCUMENTS

| | | |
|---|---|---|
| DE | 100 54 550 A1 | 5/2001 |
| EP | 1 829 680 A1 | 9/2007 |
| EP | 1 927 477 A1 | 6/2008 |
| EP | 1 944 173 A1 | 7/2008 |
| EP | 1 958 994 A1 | 8/2008 |
| EP | 1 975 210 A1 | 10/2008 |
| JP | 6-308727 A | 11/1994 |
| JP | 3112771 B2 | 9/2000 |
| JP | 2002-241647 A | 8/2002 |
| JP | 2007-231082 A | 9/2007 |

OTHER PUBLICATIONS

European Search Report dated Apr. 2, 2009.

* cited by examiner

*Primary Examiner* — Douglas McGinty
(74) *Attorney, Agent, or Firm* — Sughrue Mion, PLLC

(57) ABSTRACT

A photocurable composition is provided that includes a polymerizable compound, a photopolymerization initiator that is an acylphosphine oxide and/or an alpha-aminoacetophenone, a compound represented by Formula (I) below, and an amine compound. There are also provided a photocurable ink, a process for producing a photocured material, and an inkjet recording method.

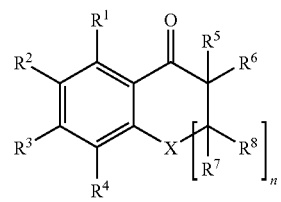

(I)

15 Claims, 2 Drawing Sheets

PHOTOCURABLE COMPOSITION, PHOTOCURABLE INK COMPOSITION, PROCESS FOR PRODUCING PHOTOCURED MATERIAL, AND INKJET RECORDING METHOD

BACKGROUND OF THE INVENTION

1. Field of the Invention

The present invention relates to a photocurable composition, a photocurable ink composition, a process for producing a photocured material, and an inkjet recording method.

2. Description of the Related Art

Photopolymerization techniques are useful techniques that are used in various applications. As compositions that are used in photopolymerization techniques, those below can be cited.

Specific examples thereof include colored or non-colored paints, varnishes, powder coatings, printing inks, inkjet recording inks, UV inks, printing plates, adhesives, dental compositions, gel coats, electronic photoresists (e.g. electroplating resists, etching resists), both liquid and dry films, compositions for producing soldering resists, compositions for producing color filters for use in various types of display devices, compositions for forming structures in processes for producing plasma display panels, electroluminescent display devices, and LCDs, composite compositions, resists such as photoresists, color filter materials, black matrixes, compositions for sealing electric and electronic components, magnetic recording materials, micromechanical components, waveguides, optical switches, plating masks, etching masks, color test systems, glass fiber cable coatings, compositions for producing screen printing stencils, compositions for producing three-dimensional materials by stereolithography, image recording materials, in particular image recording materials for holographic recording, microelectronic circuits, compositions as decolorant materials for image recording materials employing microcapsules, and compositions for forming a dielectric layer in sequential lamination of printed circuit boards.

For example, U.S. Pat. No. 4,134,813 and Japanese Registered Patent No. 3112771 disclose photopolymerizable compositions comprising 6-methylthiochroman-4-one, thiochroman-4-one, etc.

Furthermore, as a polymerizable composition for an inkjet recording ink, for example, polymerizable compositions containing an α-aminoketone compound or an acylphosphine oxide compound disclosed in JP-A-2002-241647 and JP-A-2007-231082 (JP-A denotes a Japanese unexamined patent application publication) can be cited as examples.

BRIEF SUMMARY OF THE INVENTION

However, the photopolymerizable composition described in U.S. Pat. No. 4,134,813 does not always have high photosensitivity, and in particular its sensitivity to UV light (250 nm to 400 nm), which is abundant in generally used exposure light sources, is not sufficient. Because of this, it is not suitable as a polymerizable composition such as an inkjet recording ink or a UV-curing flexo ink. It can be expected that, with regard to the means described in U.S. Pat. No. 4,134,813, since a combination of aromatic carbonyl compounds (e.g. 6-methylthiochroman-4-one and benzil dimethyl ketal) is not photochemically the most suitable, sufficient sensitivity will not be obtained.

Moreover, with regard to the means described in Japanese Registered Patent 3112771, high sensitivity can be obtained for visible light having a wavelength longer than 400 nm, but it cannot be said that the sensitivity to UV light is sufficiently high.

The ink compositions described in JP-A-2002-241647 and JP-A-2007-231082 have high sensitivity to UV light, but there are the problems of discoloration of a cured coating and various defects (odor, blocking) caused by exudation of a non-curing component from a cured coating. The blocking referred to here means that, when a printed face and a substrate face are superimposed and stored and the printed face and the substrate face are then peeled apart again, tearing of a coating on the printed face or transfer of an image to the substrate face occurs.

The present invention has been accomplished in the light of the above-mentioned circumstances, and it is an object thereof to provide a photocurable composition that has high sensitivity to UV light, which is abundant in generally used exposure light sources, and that forms a cured coating causing little discoloration or exudation of a non-curing component, and a process for producing a photocured material employing same.

In particular, it is an object thereof to provide a photocurable composition and a process for producing a photocured material that are suitable as an ink composition for photocuring inkjet recording and an inkjet recording method.

The problems to be solved by the present invention have been solved by means described in (1) and (12) to (16) below. They are described below together with (2) to (11), which are preferred embodiments.

(1) A photocurable composition comprising a polymerizable compound, a photopolymerization initiator, a compound represented by Formula (I) below, and an amine compound, the photopolymerization initiator comprising an acylphosphine oxide compound and/or an α-aminoacetophenone compound

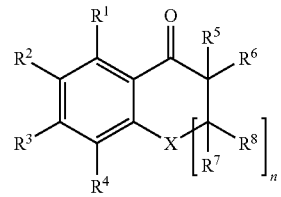

(I)

in Formula (I) above, X denotes O, S, or NR, n denotes 0 or 1, R denotes a hydrogen atom, an alkyl group, or an acyl group, $R^1$, $R^2$, $R^3$, $R^4$, $R^5$, $R^6$, $R^7$, and $R^8$ independently denote a hydrogen atom or a monovalent substituent, and two of $R^1$, $R^2$, $R^3$, and $R^4$ that are adjacent may be bonded to each other to form a ring, (2) the photocurable composition according to (1), wherein the amine compound is a tertiary amine compound, (3) the photocurable composition according to (1) or (2), wherein the amine compound is a compound having an ethylenically unsaturated bond in the molecule, (4) the photocurable composition according to any one of (1) to (3), wherein the amine compound is a compound having an ethylenically unsaturated bond and a cyclic amine structure in the molecule, (5) the photocurable composition according to any one of (1) to (4), wherein the amine compound is a compound represented by Formula (2), (3), or (4) below

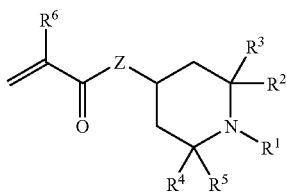
(2)

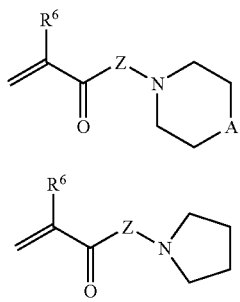
(3)

(4)

in Formulae (2) to (4), $R^1$ denotes an alkyl group, $R^2$ to $R^5$ denote a methyl group or an ethyl group, $R^6$ denotes a methyl group or a hydrogen atom, Z denotes a divalent linking group or a single bond, and A denotes a divalent organic group, (6) the photocurable composition according to any one of (1) to (5), wherein the polymerizable compound comprises a monofunctional radically polymerizable monomer having an alicyclic structure and/or an aromatic monofunctional radically polymerizable monomer, (7) the photocurable composition according to any one of (1) to (6), wherein the polymerizable compound comprises a compound represented by Formula (A3) below and/or a compound represented by Formula (A4)

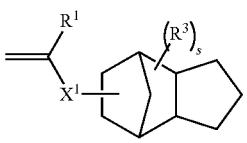
(A3)

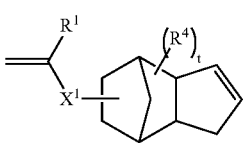
(A4)

in Formula (A3) and Formula (A4), $R^1$ denotes a hydrogen atom, a halogen atom, or an alkyl group having 1 to 4 carbons, $X^1$ denotes a divalent linking group, $R^3$ and $R^4$ independently denote a substituent, s and t independently denote an integer of 0 to 5, and the s $R^3$s and the t $R^4$s may be identical to or different from each other, (8) the photocurable composition according to any one of (1) to (7), wherein the polymerizable compound comprises a compound represented by Formula (A5) below

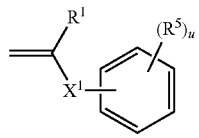
(A5)

in Formula (A5), $R^1$ denotes a hydrogen atom, a halogen atom, or an alkyl group having 1 to 4 carbons, $X^1$ denotes a divalent linking group, $R^6$ denotes a substituent, u denotes an integer of 0 to 5 and, furthermore, the u $R^5$s may be identical to or different from each other and a plurality of the $R^5$s may be bonded to each other to form a ring, which may be an aromatic ring, (9) the photocurable composition according to any one of (1) to (8), wherein the acylphosphine oxide compound comprises a compound represented by Formula (2) and/or a compound represented by Formula (3)

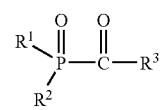
(2)

in Formula (2), $R^1$ and $R^2$ independently denote an aliphatic group, an aromatic group, an aliphatic oxy group, an aromatic oxy group, or a heterocyclic group, $R^3$ denotes an aliphatic group, an aromatic group, or a heterocyclic group, $R^1$ and $R^2$ may be bonded to form a 5-membered to 9-membered ring, and the ring structure may be a heterocycle having an oxygen atom, a nitrogen atom, a sulfur atom, etc. in the ring structure,

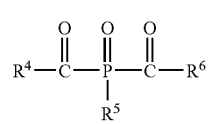
(3)

in Formula (3), $R^4$ and $R^6$ independently denote an alkyl group, an aryl group, or a heterocyclic group, and $R^5$ denotes an alkyl group, an aryl group, an alkoxy group, an aryl oxy group, or a heterocyclic group,

(10) the photocurable composition according to any one of (1) to (9), wherein the α-aminoacetophenone compound is represented by Formula (d) below

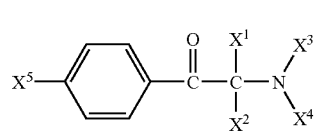
(d)

in Formula (d), $X^1$ and $X^2$ independently denote a methyl group, an ethyl group, or a benzyl group, —$NX^3X^4$ denotes a dimethylamino group, a diethylamino group, or a morpholino group, and $X^5$ denotes a hydrogen atom, an alkyl group having at least 1 but no greater than 8 carbons, an alkoxy group having at least 1 but no greater than 8 carbons, an alkylthio group having at least 1 but no greater than 8 carbons, a dimethylamino group, or a morpholino group,

(11) the photocurable composition according to any one of (1) to (10), wherein the compound represented by Formula (I) above is a compound represented by Formula (I-A)

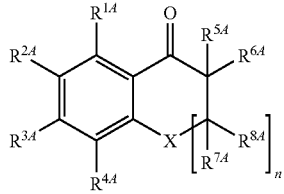
(I-A)

in Formula (I-A) above, X denotes O or S, n denotes 0 or 1, and $R^{1A}$, $R^{2A}$, $R^{3A}$, $R^{4A}$, $R^{5A}$, $R^{6A}$, $R^{7A}$ and $R^{8A}$ independently denote a hydrogen atom, a halogen atom, an alkyl group, a hydroxy group, a cyano group, a nitro group, an amino group, an alkylamino group, a dialkylamino group, an alkylthio group, an alkoxy group, an alkoxycarbonyl group, an acyloxy group, an acyl group, a carboxyl group, or a sulfo group,

(12) a photocurable ink composition comprising the photocurable composition according to any one of (1) to (11) and a colorant,

(13) an ink composition for photocuring inkjet recording comprising the photocurable ink composition according to (12) wherein it is intended for use in inkjet recording,

(14) a process for producing a photocured material, comprising a step of preparing the photocurable composition according to any one of (1) to (13), and a step of irradiating the photocurable composition with light having a light emission peak in the range of at least 340 nm but no greater than 400 nm,

(15) an inkjet recording method comprising (a) a step of discharging an ink composition onto a recording medium and (b) a step of irradiating the ink composition with actinic radiation so as to cure the ink composition, the ink composition being the ink composition according to (12) or (13), and

(16) the inkjet recording method according to (15), wherein the actinic radiation comprises UV rays having a light emission peak wavelength in the range of at least 340 nm but no greater than 400 nm.

BEST MODE FOR CARRYING OUT THE INVENTION

Figure 1:
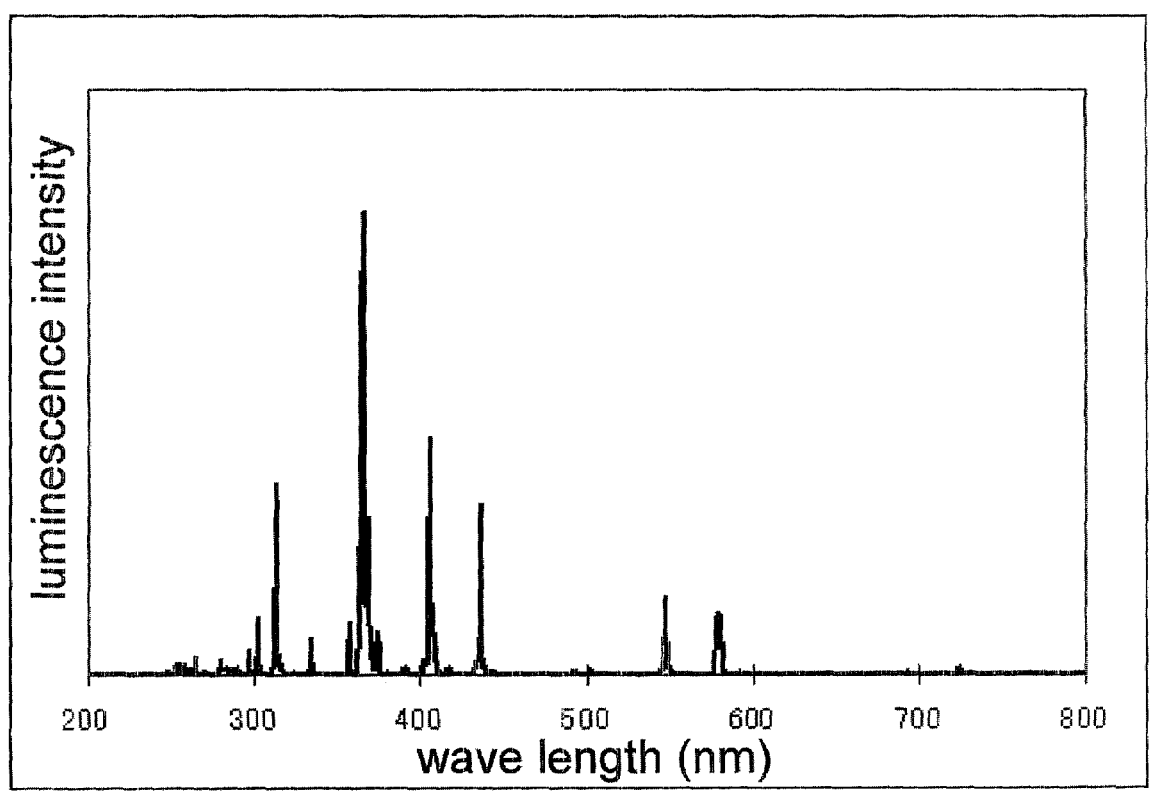
[FIG. 1] Light emission spectrum of a light source mounted in an inkjet recording device used in the Examples.

The present invention is explained in detail below.

(1) Photocurable Composition

The photopolymerizable composition of the present invention comprises (A) a polymerizable compound, (B) a photopolymerization initiator, (C) a compound represented by Formula (I) below, and (D) an amine compound, the photopolymerization initiator (B) comprising an acylphosphine oxide compound and/or an α-aminoacetophenone compound.

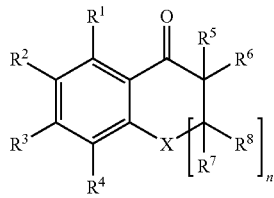
(I)

In Formula (I) above, X denotes O, S, or NR, n denotes 0 or 1, R denotes a hydrogen atom, an alkyl group, or an acyl group, $R^1$, $R^2$, $R^3$, $R^4$, $R^5$, $R^6$, $R^7$, and $R^8$ independently denote a hydrogen atom or a monovalent substituent, and two of $R^1$, $R^2$, $R^3$, and $R^4$ that are adjacent may be bonded to each other to form a ring.

In accordance with use of this photocurable composition, it is possible to achieve high sensitivity to UV light (250 nm to 400 nm), which is abundant in generally used exposure light sources, and form a cured coating and a cured material that cause little discoloration and exudation of a non-curing component. In the photocurable composition of the present invention, polymerization of the polymerizable compound is initiated by irradiation with actinic radiation, and the composition is thereby cured.

In the present invention, 'at least a but no greater than b' is also expressed as 'a to b'. That is, for example, 'at least 40 wt % but no greater than 98 wt %' is also expressed as '40 to 98 wt %' or '40 wt % to 98 wt %'.

The photocurable composition of the present invention comprises at least a polymerizable compound. From the viewpoint of image fixation when used as an ink composition, the concentration of the polymerizable compound added to the photocurable composition, relative to the total weight of the photocurable composition, is preferably at least 40 wt % but no greater than 98 wt %, more preferably at least 50 wt % but no greater than 95 wt %, and particularly preferably at least 60 wt % but no greater than 90 wt %. It is preferable for the amount of polymerizable compound added to be in the above-mentioned range since the curability is excellent and the viscosity is appropriate.

The photocurable composition of the present invention comprises at least a photopolymerization initiator. The concentration of the photopolymerization initiator added, relative to the total weight of the photocurable composition, is preferably 0.1 to 20.0 wt %, more preferably 0.5 to 18.0 wt %, and yet more preferably 1.0 to 15.0 wt %. It is preferable for the amount of photopolymerization initiator added to be in the above-mentioned range since the curability is excellent and it is appropriate from the viewpoint of suppression of surface tackiness.

The photocurable composition of the present invention comprises at least a compound represented by Formula (I) above (hereinafter, the compound represented by Formula (I) is also called compound (I)). With regard to compound (I), one type thereof may be used on its own or two or more types thereof may be used in combination. The concentration of compound (I) added to the photocurable composition, relative to the total weight of the photocurable composition, is preferably 0.1 to 15.0 wt %, more preferably 0.5 to 12.0 wt %, and yet more preferably 1.0 to 10.0 wt %. It is preferable for the amount thereof added to be in the above-mentioned range since good curability can be obtained.

The photocurable composition of the present invention comprises as the photopolymerization initiator at least one type of compound selected from the group consisting of an acylphosphine oxide compound and an α-aminoacetophenone compound. This compound is preferably a compound that initiates polymerization as a result of energy transfer when compound (I) functions as a photosensitizer.

The photocurable composition may comprise either one of the acylphosphine oxide compound and the α-hydroxyacetophenone compound or may comprise both thereof.

The concentration, relative to the total weight of the photocurable composition, of said at least one type of compound selected from the group consisting of an acylphosphine oxide compound and an α-hydroxyacetophenone compound added to the photocurable composition is preferably 0.1 to 20.0 wt % as the total amount of acylphosphine oxide compound and α-hydroxyacetophenone compound, more preferably 0.5 to 18.0 wt %, and yet more preferably 1.0 to 15.0 wt %. It is preferable for the amount added to be in the above-mentioned range since good curability can be obtained.

The photocurable composition of the present invention comprises an amine compound. The concentration of the amine compound added, relative to the total weight of the photocurable composition, is preferably 0.1 to 10.0 wt %, more preferably 0.2 to 5.0 wt %, and yet more preferably 0.3 to 3.0 wt %. It is preferable for the amount of amine compound added to be in the above-mentioned range since the curability is excellent and it is appropriate from the viewpoint of suppression of surface tackiness and prevention of discoloration of a cured coating.

(2) Photocurable Ink Composition

The photocurable composition of the present invention can suitably be used as a photocurable ink composition (hereinafter, the 'photocurable ink composition' is also called simply an 'ink composition' or an 'ink'). In particular, it is preferably used as an inkjet recording ink composition and a UV-curing printing ink composition. The photocurable composition of the present invention is particularly suitable as an inkjet recording ink composition.

When the photocurable composition of the present invention is used as an ink composition, it is preferable for the ink composition to comprise (E) a colorant.

When the photocurable composition of the present invention is used as an ink composition, the ink composition may be a liquid at room temperature, but from the viewpoint of suitability for firing droplets in inkjet, it is preferable that the viscosity at 25° C. is no greater than 100 mPa·s or the viscosity at 60° C. is no greater than 30 mPa·s, it is more preferable that the viscosity at 25° C. is no greater than 60 mPa·s or the viscosity at 60° C. is no greater than 20 mPa·s, and it is particularly preferable that the viscosity at 25° C. is no greater than 40 mPa·s or the viscosity at 60° C. is no greater than 15 mPa·s.

Similarly, from the viewpoint of suitability for firing droplets in inkjet, it is preferable that the surface tension at 25° C. of the photopolymerizable ink composition is preferably at least 18 mN/m but no greater than 40 mN/m, more preferably at least 20 mN/m but no greater than 35 mN/m, and yet more preferably at least 22 mN/m but no greater than 32 mN/m.

The 'viscosity' referred to here is a viscosity determined using a model RE80 viscometer manufactured by Toki Sangyo Co., Ltd. The model RE80 viscometer is a conical rotor/flat plate system E-type viscometer, and measurement is carried out at a rotational speed of 10 rpm using a rotor code No. 1 rotor. For those having a viscosity of higher than 60 mPa·s, measurement was carried out by changing the rotational speed as necessary to 5 rpm, 2.5 rpm, 1 rpm, 0.5 rpm, etc.

The surface tension referred to above is a value obtained by measuring at a liquid temperature of 25° C. by the Wilhelmy method using a standard surface tensiometer (e.g. a CBVP-Z surface tensiometer manufactured by Kyowa Interface Science Co., Ltd.).

The main constituent features of the photocurable composition and the ink composition of the present invention are explained in detail below.

(A) Polymerizable Compound

The photocurable composition of the present invention comprises a polymerizable compound. As the polymerizable compound, a radically polymerizable compound and a cationically polymerizable compound can be cited, and in the present invention it is preferable to use a radically polymerizable compound as the polymerizable compound.

Radically Polymerizable Compound

In the present invention, as the radically polymerizable compound, it is preferable to use a compound having an ethylenically unsaturated bond. Specific examples thereof include (meth)acrylic acid, (meth)acrylic acid esters, (meth)acrylamide compounds, and vinyl compounds (e.g. an aliphatic vinyl compound, an aromatic vinyl compound, an N-vinyl compound).

Among these, various (meth)acrylates may be used preferably as the compound having an ethylenically unsaturated bond.

Examples thereof include monofunctional monomers such as isoamyl acrylate, stearyl acrylate, lauryl acrylate, octyl acrylate, decyl acrylate, isoamylstyl acrylate, isostearyl acrylate, 2-ethylhexyl diglycol acrylate, 2-hydroxybutyl acrylate, 2-acryloyloxyethylhexahydrophthalic acid, butoxyethyl acrylate, ethoxy diethylene glycol acrylate, methoxydiethylene glycol acrylate, methoxypolyethylene glycol acrylate, methoxypropylene glycol acrylate, phenoxyethyl acrylate, tetrahydrofurfuryl acrylate, isobornyl acrylate, 2-hydroxyethyl acrylate, 2-hydroxypropyl acrylate, 2-hydroxy-3-phenoxypropyl acrylate, 2-acryloyloxyethylsuccinic acid, 2-acryloyloxyethylphthalic acid, 2-acryloyloxyethyl-2-hydroxyethylphthalic acid, a lactone-modified flexible acrylate, and t-butylcyclohexyl acrylate.

Furthermore, examples thereof include polyfunctional monomers such as triethylene glycol diacrylate, tetraethylene glycol diacrylate, polyethylene glycol diacrylate, dipropylene glycol diacrylate, tripropylene glycol diacrylate, polypropylene glycol diacrylate, 1,4-butanediol diacrylate, 1,6-hexanediol diacrylate, 1,9-nonanediol diacrylate, neopentyl glycol diacrylate, dimethyloltricyclodecane diacrylate, bisphenol A EO (ethyl-ene oxide) adduct diacrylate, bisphenol A PO (propylene oxide) adduct diacrylate, neopentyl hydroxypivalate glycol diacrylate, polytetramethylene glycol diacrylate, trimethylolpropane triacrylate, EO-modified trimethylolpropane triacrylate, pentaerythritol triacrylate, pentaerythritol tetraacrylate, dipentaerythritol hexaacrylate, ditrimethylolpropane tetraacrylate, glycerolpropoxy triacrylate, caprolactone-modified trimethylolpropane triacrylate, pentaerythritolethoxy tetraacrylate, and caprolactone-modified dipentaerythritol hexaacrylate.

In addition to the above, a polymerizable oligomer may be added in the same manner as for a monomer. Examples of the polymerizable oligomer include an epoxy acrylate, an aliphatic urethane acrylate, an aromatic urethane acrylate, a polyester acrylate, and a straight chain acrylic oligomer.

In the present invention, as the radically polymerizable compound, it is preferable to use a radically polymerizable monomer having a cyclic structure, and as the radically polymerizable monomer having a cyclic structure, it is preferable to use a monofunctional radically polymerizable monomer having an alicyclic structure and/or an aromatic monofunctional radically polymerizable monomer.

In the present invention, the monofunctional radically polymerizable monomer having an aliphatic cyclic structure and the aromatic monofunctional radically polymerizable monomer are preferably monofunctional radically polymerizable monomers represented by Formula (A1) below. The monofunctional radically polymerizable monomer having an aliphatic cyclic structure is a monofunctional radically polymerizable monomer having an alicyclic hydrocarbon group that may contain a heteroatom, and the aromatic monofunctional radically polymerizable monomer is a monofunctional radically polymerizable monomer having an aromatic group. Furthermore, the monofunctional radically polymerizable monomer is a monomer having only one polymerizable ethylenically unsaturated bond, and preferred examples of a group having a polymerizable ethylenically unsaturated bond include an acryloyloxy group, a methacryloyloxy group, an acrylamide group, a methacrylamide group, a vinyl group, and a vinyloxy group.

In the present invention, the radically polymerizable monomer having an aliphatic cyclic structure has a radically polymerizable group in addition to the aliphatic cyclic structure, and an ethylenically unsaturated bond present within the aliphatic cyclic structure does not correspond to the polymerizable ethylenically unsaturated bond.

(A1)

In Formula (A1) above, $R^1$ denotes a hydrogen atom, a halogen atom, or an alkyl group having 1 to 4 carbons, $X^1$ denotes a single bond, an ether bond (—O—), an ester bond (—C(O)O— or —OC(O)—), an amide bond (—C(O)NH— or —NHC(O)—), a carbonyl bond (—C(O)—), an optionally branched alkylene group having no greater than 20 carbons, or a second divalent linking group in which a combination thereof are bonded, and it is preferable for $X^1$ to be the first divalent linking group alone or one having an ether bond, an ester bond, and/or an alkylene group having no greater than 20 carbons when it has the second divalent linking group.

$R^2$ is an aromatic group such as a monocyclic aromatic group or a polycyclic aromatic group, or an alicyclic hydrocarbon group; the aromatic group and the alicyclic hydrocarbon group may have a halogen atom, a hydroxyl group, an amino group, a siloxane group, or a substituent having no greater than 30 carbons, and the ring structure of the aromatic group and the alicyclic hydrocarbon group may contain a heteroatom such as O, N, or S.

In Formula (A1) above, $R^1$ is preferably a hydrogen atom or an alkyl group having 1 to 4 carbons, more preferably a hydrogen atom or a methyl group, and particularly preferably a hydrogen atom.

Furthermore, $X^1$ is preferably one having an ester bond (—C(O)O—).

That is, in the present invention, the monofunctional radically polymerizable monomer having an aliphatic cyclic structure and the aromatic monofunctional radically polymerizable monomer are preferably an acrylate (acrylic acid ester) or a methacrylate (methacrylic acid ester).

The content of the monofunctional radically polymerizable monomer having an alicyclic structure and the aromatic monofunctional radically polymerizable monomer is preferably 1.0 to 80.0 wt % of the photocurable composition. It is preferable for the content to be in the above-mentioned range since good curability and flexibility of a cured coating can be obtained. It is more preferably 5.0 to 70.0 wt %, and yet more preferably 10.0 to 60.0 wt %.

It is also possible to use in combination a monofunctional radically polymerizable monomer having an alicyclic structure and an aromatic monofunctional radically polymerizable monomer, and it is also preferable to use either one thereof.

Monofunctional Radically Polymerizable Monomer Having Aliphatic Cyclic Structure $R^2$ of Formula (A1) may be an alicyclic hydrocarbon group. Furthermore, it may be a group having an alicyclic hydrocarbon group containing a heteroatom such as O, N, or S.

The alicyclic hydrocarbon group may be a group having a cycloalkane with 3 to 12 carbons.

Specific examples of the alicyclic hydrocarbon group containing a heteroatom such as O, N, or S include groups formed by removing at least one hydrogen from pyrrolidine, pyrazolidine, imidazolidine, isooxazolidine, isothiazolidine, piperidine, piperazine, morpholine, thiomorpholine, diazole, triazole, and tetrazole.

The alicyclic hydrocarbon group and the heterocycle-containing alicyclic hydrocarbon group may have a substituent, and the substituent is preferably a halogen atom, a hydroxyl group, an amino group, a thiol group, a siloxane group, an optionally substituted hydrocarbon group having a total of no greater than 30 carbons, a heterocyclic group containing a heteroatom such as O, N, or S, or an oxy group (=O) as a divalent substituent.

The monofunctional radically polymerizable monomer having an aliphatic cyclic structure is preferably a compound having a norbornane skeleton represented by Formula (A2) below.

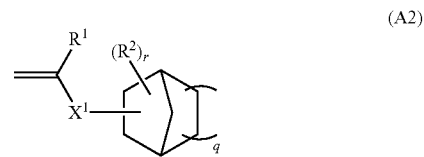

(A2)

In Formula (A2) it is preferable that $R^1$ denotes a hydrogen atom, a halogen atom, or an alkyl group having 1 to 4 carbons, and $X^1$ denotes a divalent linking group, and preferably an ether group (—O—), an ester group (—C(O)O— or —OC(O)—), an amide group (—C(O)NR'—), a carbonyl group (—C(O)—), a nitrogen atom (—NR'—), an optionally substituted alkylene group having 1 to 15 carbons, or a divalent group in which two or more thereof are combined. $R^1$ denotes a hydrogen atom, a straight-chain, branched, or cyclic alkyl group having 1 to 20 carbons, or an aryl group having 6 to 20 carbons. $R^2$ denotes a substituent, r denotes an integer of 0 to 5, q denotes a cyclic hydrocarbon structure, the cyclic hydrocarbon structure may comprise a carbonyl bond (—C(O)—) and/or an ester bond (—C(O)O—) in addition to a hydrocarbon bond, the r $R^2$s may be identical to or different from each other, and one carbon atom in the norbornane skeleton may be replaced by an ether bond (—O—) and/or an ester bond (—C(O)O—).

In Formula (A2), $R^1$ is preferably a hydrogen atom or an alkyl group having 1 to 4 carbons, and more preferably a hydrogen atom or a methyl group.

The end of $X^1$ in Formula (A2) that is bonded to the vinyl group is preferably an ester group or an amide group via which a carbonyl carbon of $X^1$ is bonded to the vinyl group, and is more preferably an ester bond. One having the structure $H_2C=C(R^1)-C(O)O-$ is particularly preferable. In this case, another moiety of $X^1$ that is bonded to the norbornane skeleton may be a single bond or one freely selected from the groups above.

The vinyl moiety containing $R^1$ and $X^1$ ($H_2C=C(R^1)-X^1-$) may be bonded to any position of the alicyclic hydrocarbon structure. The 'alicyclic hydrocarbon structure' means the norbornane structure and the cyclic hydrocarbon structure comprising q of Formula (A2).

From the viewpoint of improving affinity with a colorant, the end of $X^1$ bonded to the alicyclic hydrocarbon structure in Formula (A2) is preferably an oxygen atom, and more preferably an ethereal oxygen atom, and $X^1$ in Formula (A2) is yet more preferably $-C(O)O(CH_2CH_2O)_p-$ (p denotes 1 or 2).

The $R^2$s in Formula (A2) independently denote a substituent that may be bonded to any position on the alicyclic hydrocarbon structure. Furthermore, the r $R^2$s may be identical to or different from each other.

The r $R^2$s may independently be a monovalent or polyvalent substituent; the monovalent substituent is preferably a hydroxyl group, a substituted or unsubstituted amino group, a thiol group, a siloxane group, or an optionally substituted hydrocarbon group or heterocyclic group having a total of no greater than 30 carbons, and a divalent substituent is preferably an oxy group (=O).

The substitution number r for $R^2$ denotes an integer of 0 to 5.

q in Formula (A2) denotes a cyclic hydrocarbon structure whose opposite termini may substitute any positions of the norbornane skeleton; it may be a monocyclic structure or a polycyclic structure, and it may contain a carbonyl bond ($-C(O)-$) and/or an ester bond ($-C(O)O-$) as well as the hydrocarbon bonds in the cyclic hydrocarbon structure.

The monomer represented by Formula (A2) above is preferably a monomer represented by Formula (A3) or Formula (A4). The unsaturated bond in the cyclic hydrocarbon structure of Formula (A4) has low radical polymerizability, and in the present invention a compound represented by Formula (A4) is considered as a monofunctional radically polymerizable monomer.

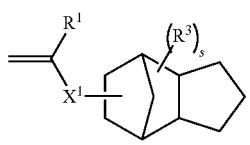
(A3)

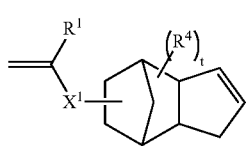
(A4)

In Formula (A3) and Formula (A4), $R^1$ denotes a hydrogen atom, a halogen atom, or an alkyl group having 1 to 4 carbons, $X^1$ denotes a divalent linking group, $R^3$ and $R^4$ independently denote a substituent, s and t independently denote an integer of 0 to 5, and the s $R^3$s and the t $R^4$s may be identical to or different from each other.

$R^1$ and $X^1$ in Formula (A3) or Formula (A4) have the same meanings as those of $R^1$ and $X^1$ in Formula (A2) and preferred ranges are also the same.

The vinyl moiety containing $R^1$ and $X^1$ in Formula (A3) or Formula (A4) may be bonded to any position on the alicyclic hydrocarbon structures in Formula (A3) and Formula (A4) below.

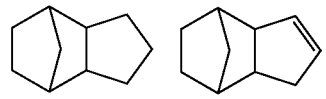

$R^3$ and $R^4$ in Formula (A3) and Formula (A4) independently denote a substituent, and it may be bonded to any position on the alicyclic hydrocarbon structures in Formula (A3) and Formula (A4). The substituent denoted by $R^3$ or $R^4$ has the same meaning as that of the substituent denoted by $R^2$ in Formula (A2), and a preferred range is also the same.

s and t in Formula (A3) or Formula (A4) independently denote an integer of 0 to 5, and the s $R^3$s and the t $R^4$s may be identical to or different from each other.

Preferred specific examples of monofunctional acrylates as the monomer represented by Formula (A2) are shown below.

In some of the compound examples below, a hydrocarbon chain is represented by a simplified structural formula in which symbols for carbon (C) and hydrogen (H) are omitted.

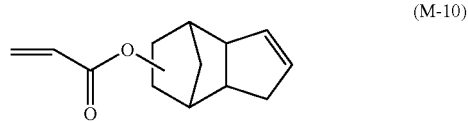
(M-10)

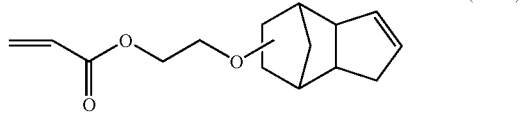
(M-11)

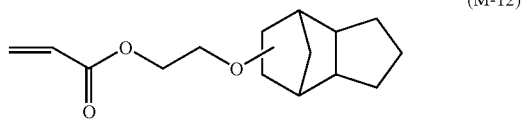
(M-12)

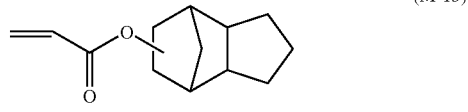
(M-13)

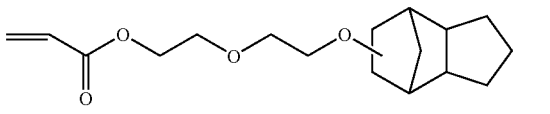
(M-14)

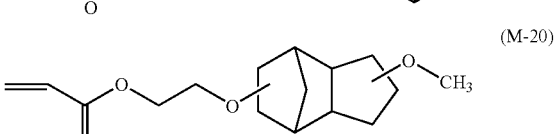
(M-20)

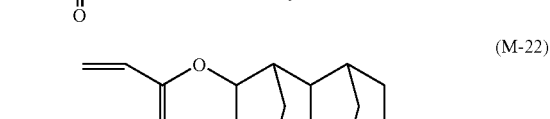
(M-22)

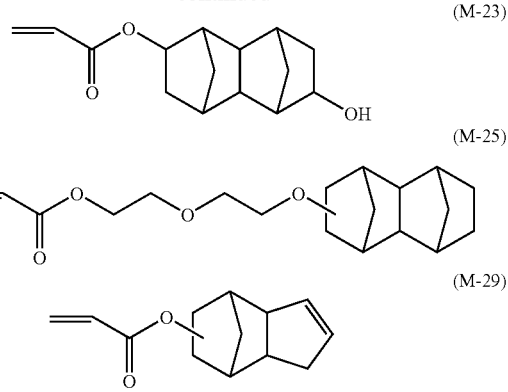

Preferred specific examples of monofunctional methacrylates as the monomer represented by Formula (A2) are shown below.

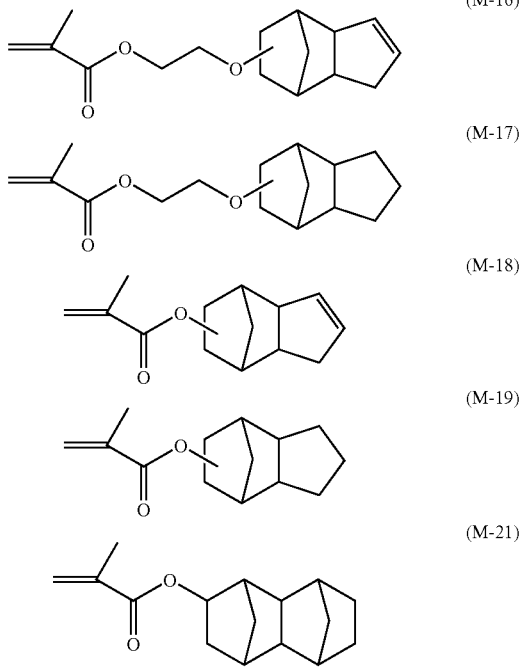

A preferred specific example of a monofunctional acrylamide as the monomer represented by Formula (A2) is shown below.

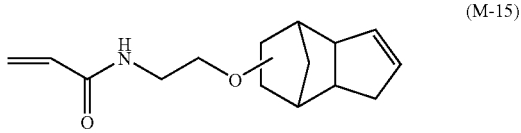

Aromatic Monofunctional Radically Polymerizable Monomer

The aromatic monofunctional radically polymerizable monomer is preferably a polymerizable monomer represented by Formula (A5) below.

(A5)

(In Formula (A5), $R^1$ denotes a hydrogen atom, a halogen atom, or an alkyl group having 1 to 4 carbons, $X^1$ denotes a divalent linking group, $R^5$ denotes a substituent, u denotes an integer of 0 to 5, the u $R^5$s may be identical to or different from each other, the plurality of $R^5$s may be bonded to each other to form a ring, and the ring may be an aromatic ring.)

In Formula (A5), $R^1$ is preferably a hydrogen atom or an alkyl group having 1 to 4 carbons, more preferably a hydrogen atom or a methyl group, and yet more preferably a hydrogen atom.

$X^1$ has the same meaning as that of $X^1$ in Formula (A2), and a preferred range is also the same.

The u $R^5$s may independently be a monovalent or polyvalent substituent, and the monovalent substituent is preferably a hydroxyl group, a substituted or unsubstituted amino group, thiol group, or siloxane group, or an optionally substituted hydrocarbon group or heterocyclic group having a total number of carbons of no greater than 30.

In Formula (A5), the plurality of $R^5$s preferably form an aromatic ring when they are bonded to each other to form a ring.

That is, in Formula (A5), the aromatic group is preferably a group (a phenyl group, a phenylene group, etc.) in which at least one hydrogen is removed from benzene, which is a monocyclic aromatic group, or a polycyclic aromatic group having 2 to 4 rings, but is not limited thereto. Specific examples thereof include a group in which at least one hydrogen atom is removed from naphthalene, anthracene, 1H-indene, 9H-fluorene, 1H-phenalene, phenanthrene, triphenylene, pyrene, naphthacene, tetraphenylene, biphenylene, as-indacene, s-indacene, acenaphthylene, fluoranthene, acephenanthrylene, aceanthrylene, chrysene, or pleiadene.

These aromatic groups may be aromatic heterocyclic groups containing a heteroatom such as O, N, or S. Specific examples thereof include a group in which at least one hydrogen atom is removed from a monocyclic aromatic heterocyclic compound such as furan, thiophene, 1H-pyrrole, 2H-pyrrole, 1H-pyrazole, 1H-imidazole, isoxazole, isothiazole, 2H-pyran, 2H-thiopyran, pyridine, pyridazine, pyrimidine, pyrazine, 1,2,3-triazole, or 1,2,4-triazole.

Furthermore, examples include a group in which at least one hydrogen atom is removed from a polycyclic aromatic heterocyclic compound such as thianthrene, isobenzofuran, isochromene, 4H-chromene, xanthene, phenoxathiine, indolizine, isoindole, indole, indazole, purine, 4H-quinolizine, isoquinoline, quinoline, phthalazine, naphthyridine, quinoxaline, quinazoline, cinnoline, pteridine, carbazole, β-carboline, phenanthridine, acridine, perimidine, phenanthroline, phenazine, phenothiazine, phenoxazine, or pyrrolidine.

These aromatic groups may have one or more halogen atom, hydroxyl group, amino group, thiol group, siloxane group, or substituent having no greater than 30 carbons. A cyclic structure containing a heteroatom such as O, N, or S may b formed from two or more substituents possessed by the aromatic group as in, for example, phthalic anhydride or phthalimide anhydride.

In the present invention, the polycyclic aromatic group is more preferably a polycyclic aromatic group having 2 to 3 rings, and is particularly preferably, a naphthyl group.
Preferred specific examples of the aromatic monofunctional radically polymerizable monomer include, but are not limited to, [L-1] to [L-71] below.
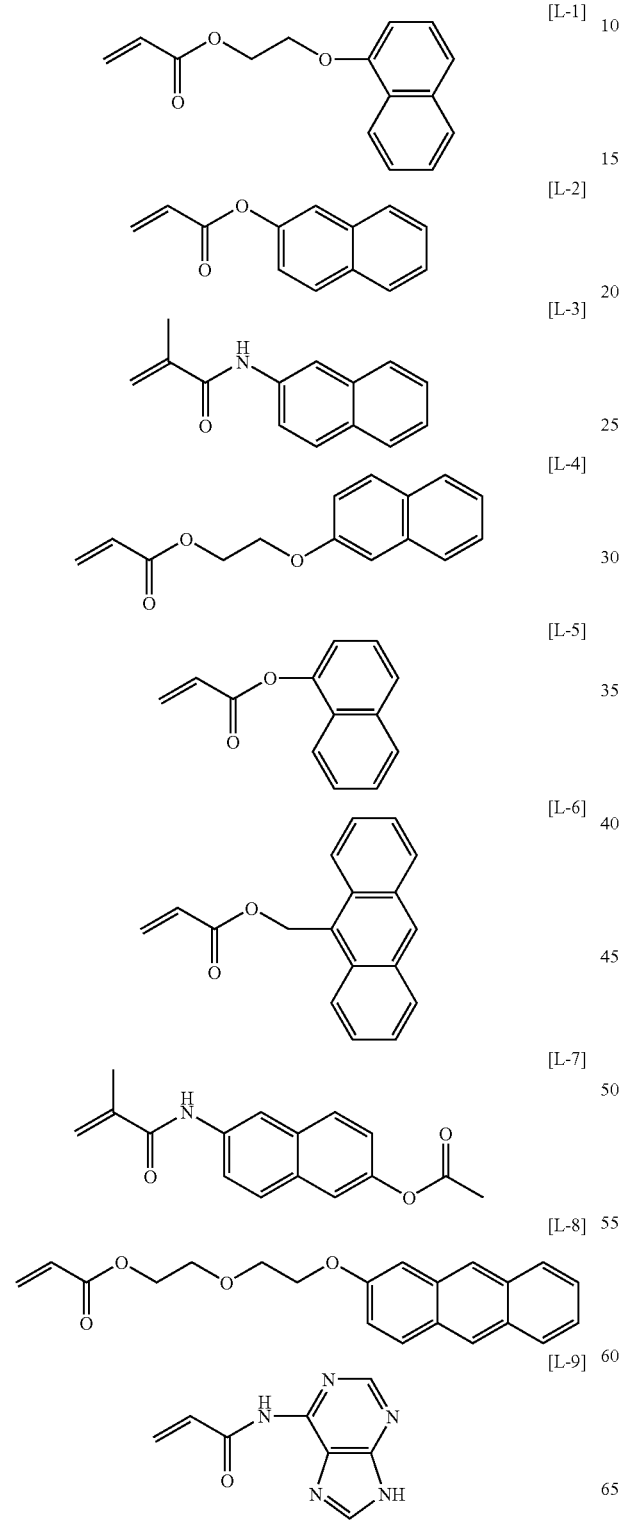

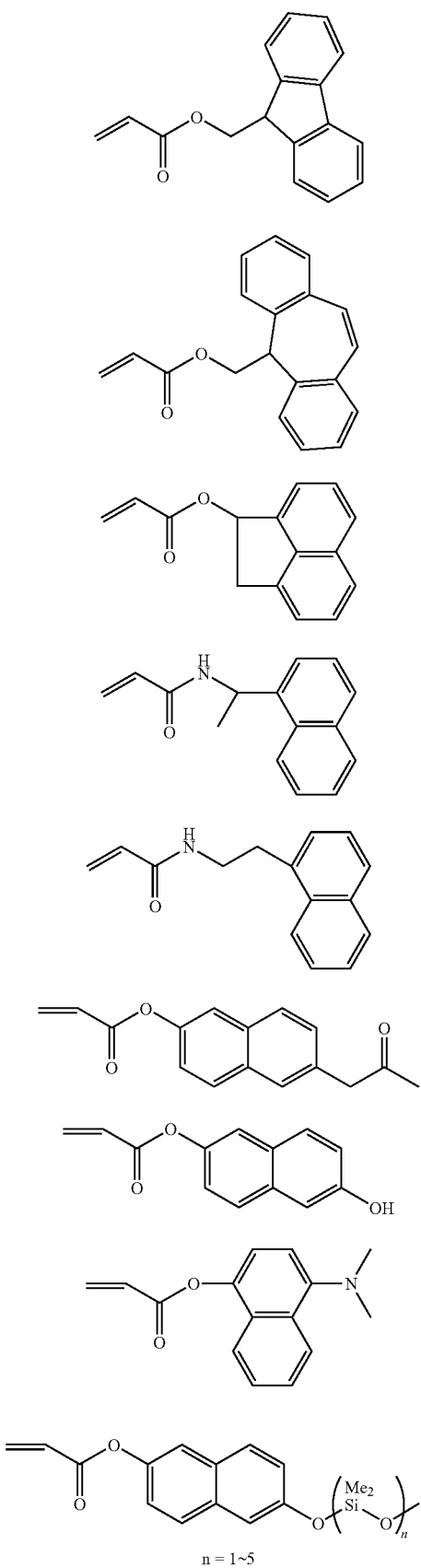
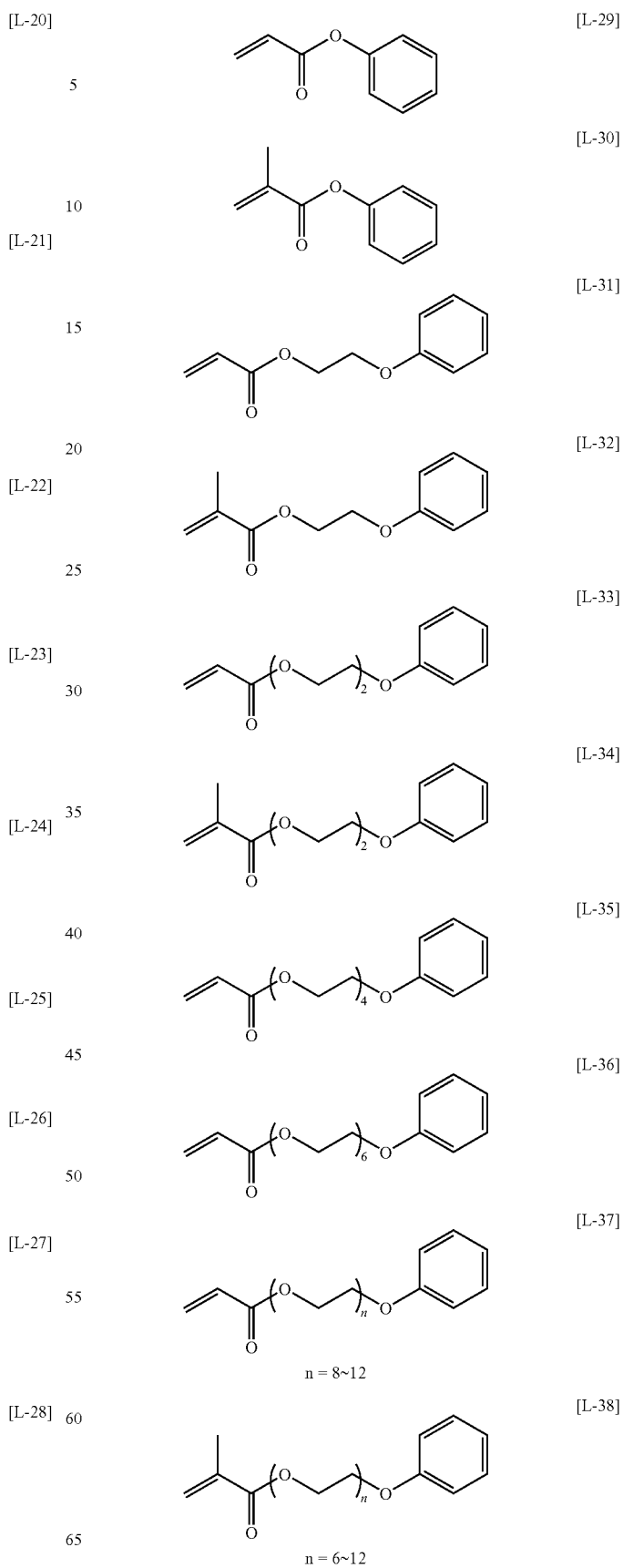

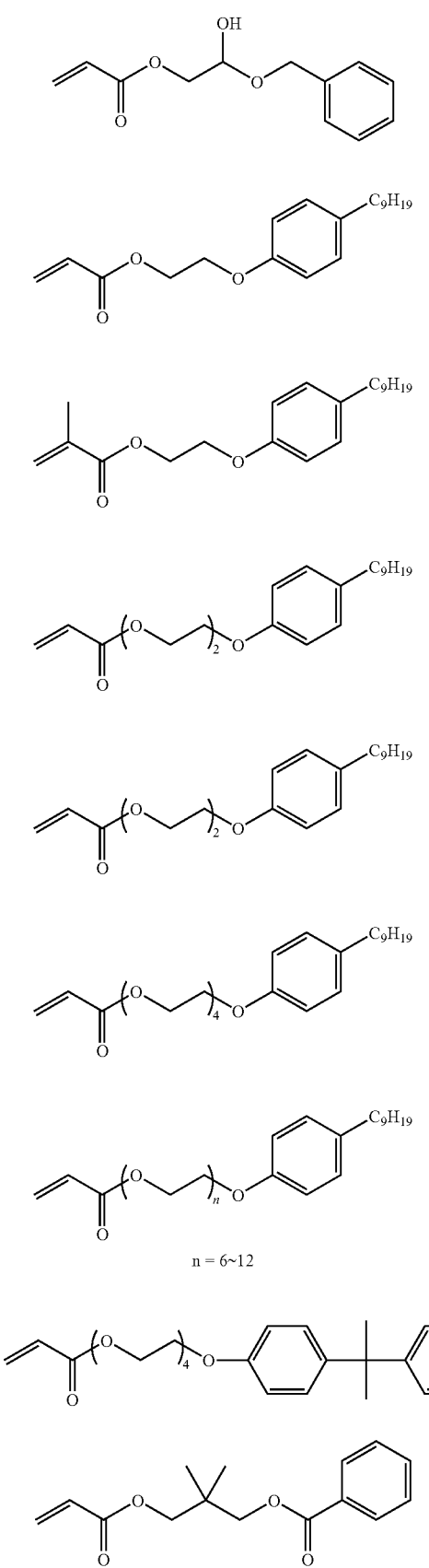
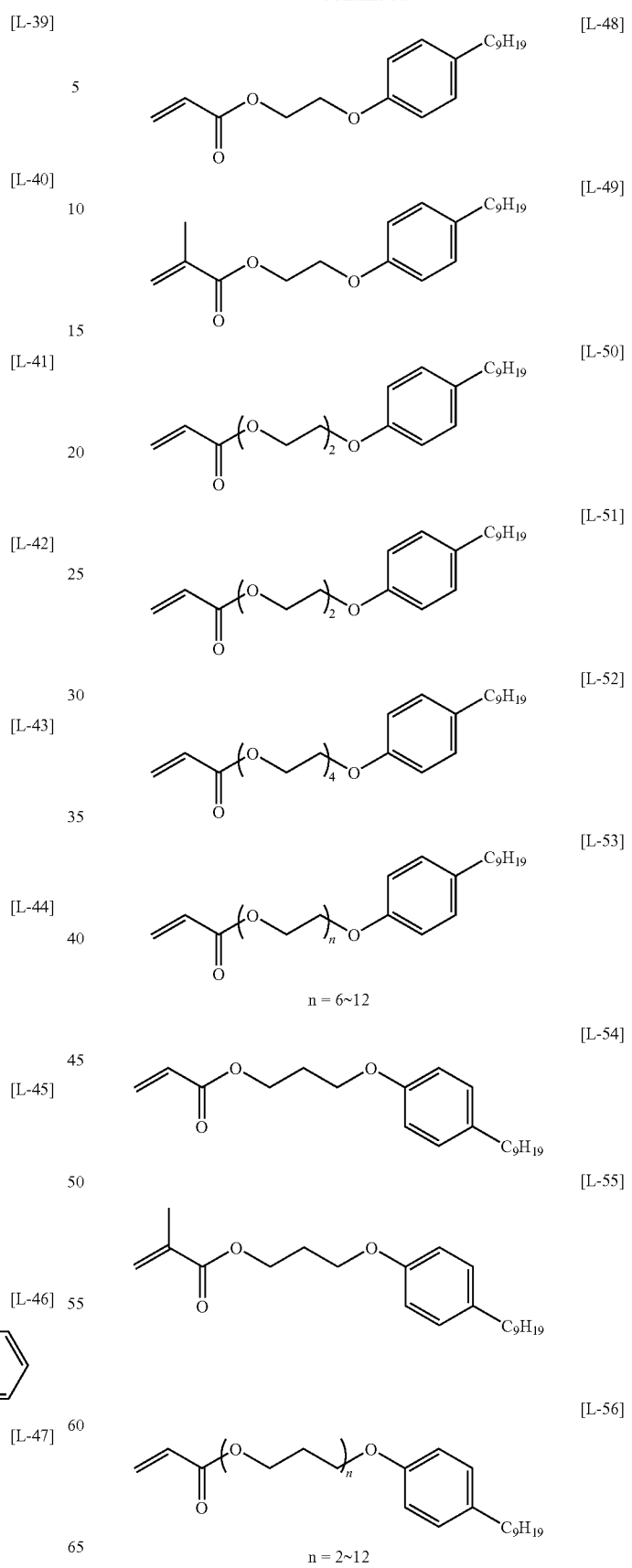

-continued

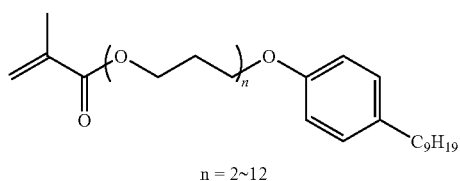
[L-57]

n = 2~12

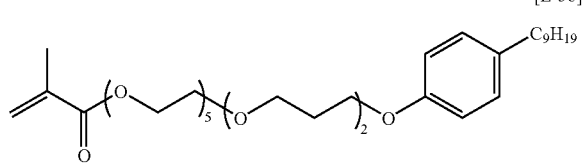
[L-58]

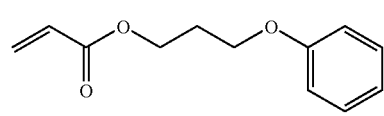
[L-59]

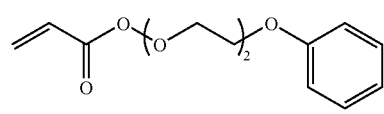
[L-60]

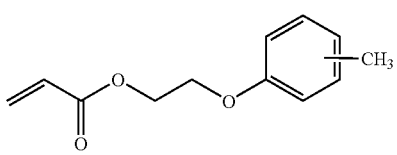
[L-61]

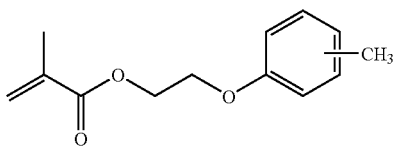
[L-62]

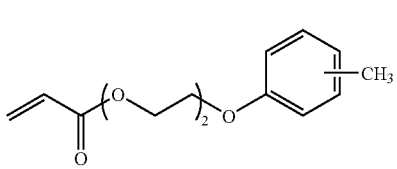
[L-63]

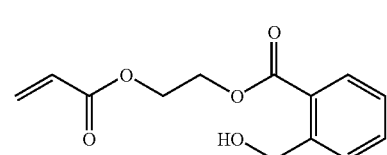
[L-64]

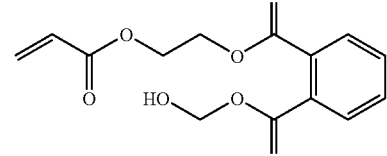
[L-65]

-continued

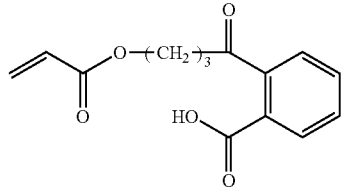
[L-66]

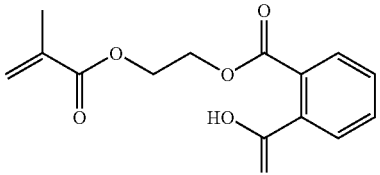
[L-67]

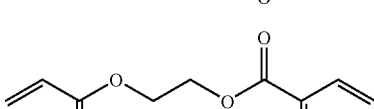
[L-68]

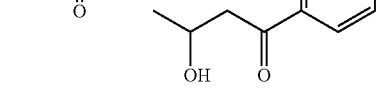
[L-69]

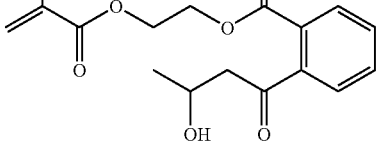

There is a case in which amine compound (D), which is explained later, corresponds to the polymerizable compound. For example, a case in which amine compound (D) has an ethylenically unsaturated bond can be cited as an example. In the present invention, it is preferable that as the radically polymerizable compound, another radically polymerizable compound that does not correspond to the amine compound is contained, and it is particularly preferable that another polymerizable compound that does not correspond to a tertiary amine compound is contained. The preferred content of the polymerizable compound described above does not include the content of the compound corresponding to amine compound (D).

(B) Photopolymerization Initiator

In the present invention, an acylphosphine oxide compound and/or an α-aminoacetophenone compound are contained as the photopolymerization initiator.

In the present invention, as the photopolymerization initiator, in addition to an acylphosphine oxide compound and an α-aminoacetophenone compound, a known radical polymerization initiator may be used in combination.

The photopolymerization initiator that can be used in the present invention is a compound that generates a polymerization initiating species upon exposure to actinic radiation. Examples of the actinic radiation include γ rays, β rays, an electron beam, ultraviolet rays, visible light, and infrared light, and from the viewpoint of equipment cost and operational safety, ultraviolet rays and visible light are preferable.

In the present invention, at least one type of compound selected from the group consisting of an acylphosphine oxide compound and an α-aminoacetophenone compound is contained as the photopolymerization initiator. In accordance with the use of an acylphosphine oxide compound and/or an α-aminoacetophenone compound as the photopolymerization initiator, curability can be enhanced. In particular, the use of these photopolymerization initiators can enhance the curability in the interior of a coating.

Furthermore, in the present invention, it is preferable to use as the photopolymerization initiator at least one type of acylphosphine oxide compound and at least one type of α-aminoacetophenone compound in combination.

Examples of the acylphosphine oxide compound and the α-aminoacetophenone compound that can be used preferably are as follows.

Acylphosphine Oxide Compound

As the acylphosphine oxide compound, a compound represented by Formula (2) or Formula (3) below is preferable.

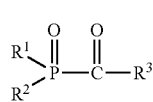

(2)

$R^1$ and $R^2$ in Formula (2) above independently denote an aliphatic group, an aromatic group, an aliphatic oxy group, an aromatic oxy group, or a heterocyclic group, and $R^3$ denotes an aliphatic group, an aromatic group, or a heterocyclic group. $R^1$ and $R^2$ above may be bonded to form a 5-membered 5 to 9-membered ring. The ring structure may be a heterocycle having in the ring structure an oxygen atom, a nitrogen atom, a sulfur atom, etc.

Examples of the aliphatic group represented by $R^1$, $R^2$, or $R^3$ above include an alkyl group, a substituted alkyl group, an alkenyl group, a substituted alkenyl group, an alkynyl group, a substituted alkynyl group; among them, an alkyl group, a substituted alkyl group, an alkenyl group, a substituted alkenyl group are preferable, and an alkyl group and a substituted alkyl group are particularly preferable. Furthermore, the aliphatic group may be a cyclic aliphatic group or an open-chain aliphatic group. The open-chain aliphatic group may be branched.

Examples of the alkyl group include straight chain, branched, and cyclic alkyl groups, and the number of carbons in the alkyl group is preferably at least 1 but no greater than 30, and more preferably at least 1 but no greater than 20. A preferred range for the number of carbons in the alkyl moiety of the substituted alkyl group is the same as for the alkyl group above. Examples of the alkyl group include a methyl group, an ethyl group, a propyl group, a butyl group, a pentyl group, a hexyl group, an octyl group, a 2-ethylhexyl group, a decyl group, a dodecyl group, an octadecyl group, a cyclohexyl group, an cyclopentyl group, a neopentyl group, an isopropyl group, and an isobutyl group.

Examples of the substituent of the substituted alkyl group include —COOH (carboxyl group), —SO₃H (sulfo group), —CN (cyano group), a halogen atom (e.g. a fluorine atom, a chlorine atom, a bromine atom), —OH (hydroxy group), an alkoxycarbonyl group having no greater than 30 carbons (e.g. a methoxycarbonyl group, an ethoxycarbonyl group, a benzyloxycarbonyl group), an alkylsulfonylaminocarbonyl group having no greater than 30 carbons, an arylsulfonylaminocarbonyl group having no greater than 30 carbons, an alkylsulfonyl group having no greater than 30 carbons, an arylsulfonyl group having no greater than 30 carbons, an acylaminosulfonyl group having no greater than 30 carbons, an alkoxy group having no greater than 30 carbons (e.g. a methoxy group, an ethoxy group, a benzyloxy group, a phenoxyethoxy group, a phenethyloxy group), an alkylthio group having no greater than 30 carbons (e.g. a methylthio group, an ethylthio group, a methylthioethylthioethyl group), an aryloxy group having no greater than 30 carbons (e.g. a phenoxy group, a p-tolyloxy group, a 1-naphthoxy group, a 2-naphthoxy group), a nitro group, an alkoxycarbonyloxy group having no greater than 30 carbons, an aryloxycarbonyloxy group having no greater than 30 carbons, an acyloxy group having no greater than 30 carbons (e.g. an acetyloxy group, a propionyloxy group), an acyl group having no greater than 30 carbons (e.g. an acetyl group, a propionyl group, a benzoyl group), a carbamoyl group (e.g. a carbamoyl group, an N,N-dimethylcarbamoyl group, a morpholinocarbonyl group, a piperidinocarbonyl group), a sulfamoyl group (e.g. a sulfamoyl group, an N,N-dimethylsulfamoyl group, a morpholinosulfonyl group, a piperidinosulfonyl group), an aryl group having no greater than 30 carbons (e.g. a phenyl group, a 4-chlorophenyl group, a 4-methylphenyl group, an α-naphthyl group), a substituted amino group (e.g. an amino group, an alkylamino group, a dialkylamino group, an arylamino group, a diarylamino group, an acylamino group), a substituted ureido group, a substituted phosphono group, and a heterocyclic group. Here, the carboxyl group, the sulfo group, the hydroxy group, and the phosphono group may be in the form of a salt. In this case, a cation forming the salt is a group that can form a positive ion, and is preferably an organic cationic compound, a transition metal coordination complex cation (a compound described in Japanese registered patent No. 2791143, etc.), or a metal cation (e.g. $Na^+$, $K^+$, $Li^+$, $Ag^+$, $Fe^{2+}$, $Fe^{3+}$, $Cu^+$, $Cu^{2+}$, $Zn^{2+}$, $Al^{3+}$).

Examples of the alkenyl group include straight chain, branched, and cyclic alkenyl groups, and the number of carbons of the alkenyl group is preferably at least 2 but no greater than 30, and more preferably at least 2 but no greater than 20. Furthermore, the alkenyl group may be an unsubstituted alkenyl group or a substituted alkenyl group having a substituent, and a preferred range for the number of carbons in the alkenyl moiety of the substituted alkenyl group is the same as for the alkenyl group above. Examples of the substituent of the substituted alkenyl group include the same substituents as for the above substituted alkyl group.

Examples of the alkynyl group include straight chain, branched, and cyclic alkynyl groups, and the number of carbons of the alkynyl group is preferably at least 2 but no greater than 30, and more preferably at least 2 but no greater than 20. Furthermore, the alkynyl group may be an unsubstituted alkynyl group or a substituted alkynyl group having a substituent, and a preferred range for the number of carbons in the alkynyl moiety of the substituted alkynyl group is the same as for the alkynyl group above. Examples of the substituent of the substituted alkynyl group include the same substituents as for the above substituted alkyl group.

Examples of the aromatic group represented by $R^1$, $R^2$, or $R^3$ include an aryl group and a substituted aryl group. The number of carbons of the aryl group is preferably at least 6 but no greater than 30, and more preferably at least 6 but no greater than 20. A preferred range for the number of carbons in the aryl moiety of the substituted aryl group is the same as for the aryl group above. Examples of the aryl group include a phenyl group, an α-naphthyl group, and a β-naphthyl group. Examples of the substituent of the substituted aryl group include the same substituents as for the above substituted alkyl group, and straight chain, branched, and cyclic alkyl groups having no greater than 30 carbons.

The aliphatic oxy group represented by $R^1$ or $R^2$ above is preferably an alkoxy group having at least 1 but no greater than 30 carbons, and examples thereof include a methoxy group, an ethoxy group, a butoxy group, an octyloxy group, and a phenoxyethoxy group. However, the examples are not limited thereto.

The aromatic oxy group represented by $R^1$ or $R^2$ above is preferably an aryloxy group having at least 6 but no greater than 30 carbons, and examples thereof include a phenoxy group, a methylphenyloxy group, a chlorophenyloxy group, a methoxyphenyloxy group, and an octyloxyphenyloxy group. However, the examples are not limited thereto.

The heterocyclic group represented by $R^1$, $R^2$, or $R^3$ above is preferably an N, O, or S atom-containing heterocyclic group, and examples thereof include a pyridyl group, a furyl group, a thienyl group, an imidazolyl group, and a pyrrolyl group.

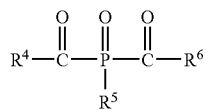
(3)

$R^4$ and $R^6$ in Formula (3) above independently denote an alkyl group, an aryl group, or a heterocyclic group, and $R^5$ denotes an alkyl group, an aryl group, an alkoxy group, an aryloxy group, or a heterocyclic group.

The alkyl group, aryl group, heterocyclic group, alkoxy group, and aryloxy group denoted by $R^4$, $R^5$, or $R^6$ may have a substituent, and examples of the substituent include the same substituents as in the case of Formula (2) above.

The alkyl group, aryl group, heterocyclic group, alkoxy group, and aryloxy group in Formula (3) above are the same as those in Formula (2) above.

The compound represented by Formula (2) above is preferably a compound represented by Formula (4) below.

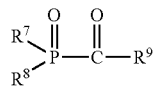
(4)

In Formula (4), $R^7$ and $R^8$ independently denote a phenyl group, a methoxy group, or an isopropoxy group, and $R^9$ denotes a 2,4,6-trimethylphenyl group, a 2,4-dimethylphenyl group, a 2-methylphenyl group (o-toluoyl group), an isobutyl group, or a t-butyl group.

The compound represented by Formula (3) above is preferably a compound represented by Formula (5) below.

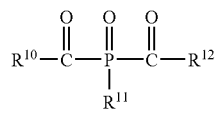
(5)

In Formula (5), $R^{10}$ and $R^{12}$ independently denote a 2,4,6-trimethylphenyl group, a 2,6-dimethylphenyl group, or a 2,6-dimethoxyphenyl group, and $R^{11}$ denotes a phenyl group or a 2,4,4-trimethylpentyl group.

Examples of the acylphosphine oxide compound represented by Formula (2) or (3) above include compounds described in JP-B-63-40799 (JP-B denotes a Japanese examined patent application publication), JP-B-5-29234, JP-A-10-95788, JP-A-10-29997, etc.

Specific examples of the acylphosphine oxide compound include the compounds shown below (compound examples (P-1) to (P-26)), but the present invention is not limited thereto.

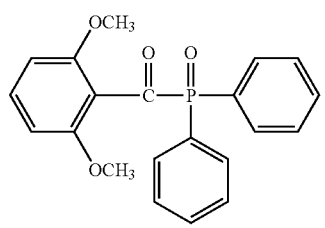
(P-1)

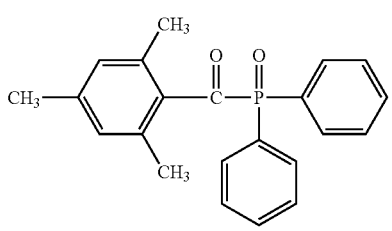
(P-2)

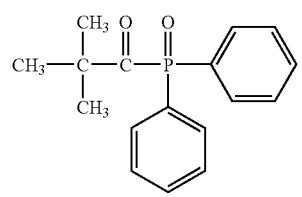
(P-3)

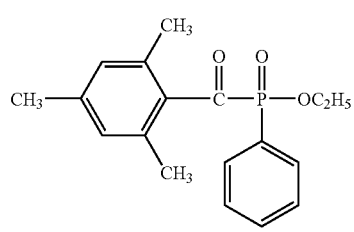
(P-4)

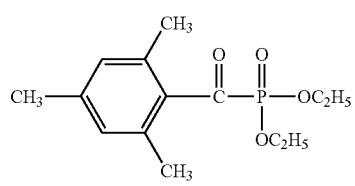
(P-5)

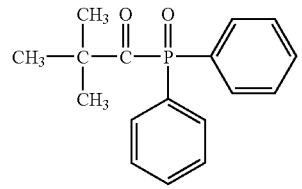
(P-6)

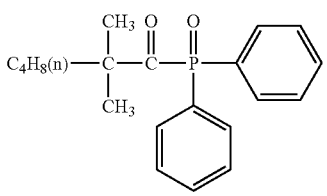
(P-7)

(P-8) 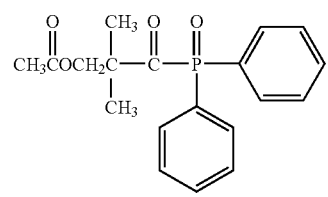
(P-9) 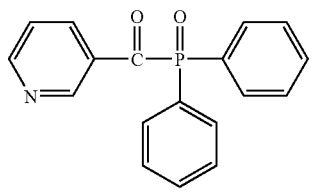
(P-10) 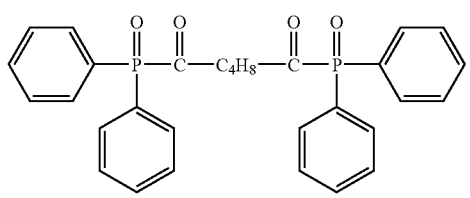
(P-11) 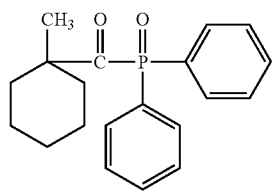
(P-12) 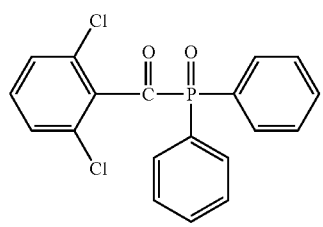
(P-13) 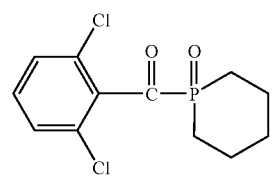
(P-14) 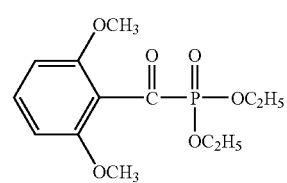
(P-15) 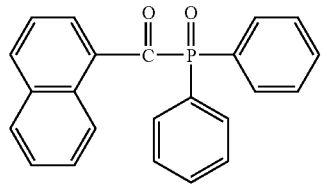
(P-16) 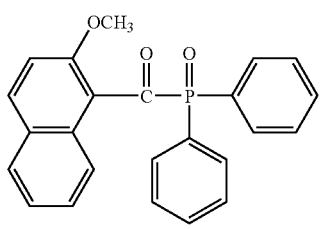
(P-17) 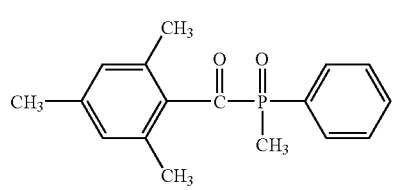
(P-18) 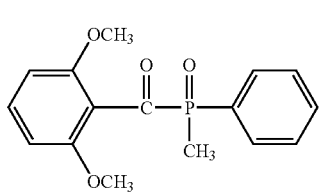
(P-19) 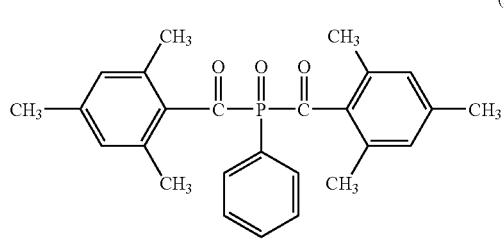
(P-20) 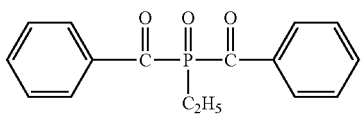
(P-21) 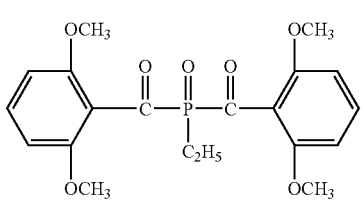
(P-22) 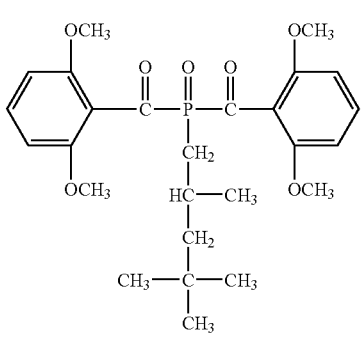

(P-23)

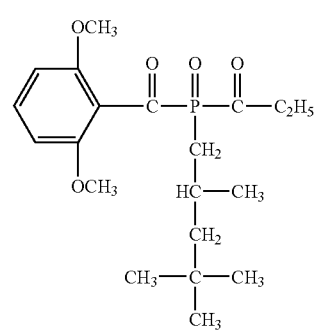

(P-24)

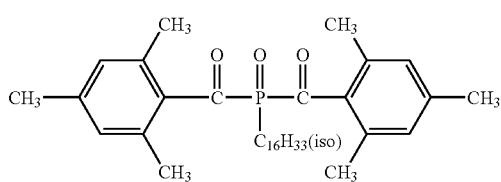

(P-25)

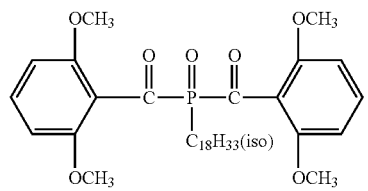

(P-26)

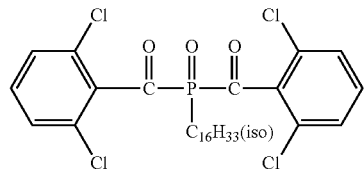

As the acylphosphine oxide compound, a monoacylphosphine oxide compound, a bisacylphosphine oxide compound, etc. may be used, and as the monoacylphosphine oxide compound a known monoacylphosphine oxide compound may be used. Examples thereof include bis(2,4,6-trimethylbenzoyl)phenylphosphine oxide, monoacylphosphine oxide compounds described in JP-B-60-8047 and JP-B-63-40799. Specific examples thereof include bis(2,4,6-trimethylbenzoyl)phenylphosphine oxide, 2,4,6-trimethylbenzoyldiphenylphosphine oxide, methyl isobutyrylmethylphosphinate, methyl isobutyrylphenylphosphinate, methyl pivaloylphenylphosphinate, methyl 2-ethylhexanoylphenylphosphinate, isopropyl pivaloylphenylphosphinate, methyl p-toluoylphenylphosphinate, methyl o-toluoylphenylphosphinate, methyl 2,4-dimethylbenzoylphenylphosphinate, isopropyl p-tert-butylbenzoylphenylphosphinate, methyl acryloylphenylphosphinate, isobutyryldiphenylphosphine oxide, 2-ethylhexanoyldiphenylphosphine oxide, o-toluoyldiphenylphosphine oxide, p-tert-butylbenzoyldiphenylphosphine oxide, 3-pyridylcarbonyldiphenylphosphine oxide, acryloyidiphenylphosphine oxide, benzoyldiphenylphosphine oxide, vinyl pivaloylphenylphosphinate, adipoylbis(diphenylphosphine oxide), pivaloyidiphenylphosphine oxide, p-toluyidiphenylphosphine oxide, 4-(tert-butyl)benzoyldiphenylphosphine oxide, 2-methylbenzoyidiphenylphosphine oxide, 2-methyl-2-ethylhexanoyidiphenylphosphine oxide, 1-methylcyclohexanoyldiphenylphosphine oxide, methyl pivaloylphenylphosphinate, and isopropyl pivaloylphenylphosphinate.

As the bisacylphosphine oxide compound a known bisacylphosphine oxide compound may be used. Examples thereof include bisacylphosphine oxide compounds described in JP-A-3-101686, JP-A-5-345790, and JP-A-6-298818. Specific examples thereof include bis(2,6-dichlorobenzoyl)phenylphosphine oxide, bis(2,6-dichlorobenzoyl)-2,5-dimethylphenylphosphine oxide, bis(2,6-dichlorobenzoyl)-4-ethoxyphenylphosphine oxide, bis(2,6-dichlorobenzoyl)-4-propylphenylphosphine oxide, bis(2,6-dichlorobenzoyl)-2-naphthylphosphine oxide, bis(2,6-dichlorobenzoyl)-1-naphthylphosphine oxide, bis(2,6-dichlorobenzoyl)-4-chlorophenylphosphine oxide, bis(2,6-dichlorobenzoyl)-2,4-dimethoxyphenylphosphine oxide, bis (2,6-dichlorobenzoyl)decylphosphine oxide, bis(2,6-dichlorobenzoyl)-4-octylphenylphosphine oxide, bis(2,4,6-trimethylbenzoyl)phenylphosphine oxide, bis(2,4,6-trimethylbenzoyl)-2,5-dimethylphenylphosphine oxide, bis (2,6-dichloro-3,4,5-trimethoxybenzoyl)-2,5-dimethylphenylphosphine oxide, bis(2,6-dichloro-3,4,5-trimethoxybenzoyl)-4-ethoxyphenylphosphine oxide, bis(2-methyl-1-naphthoyl)-2,5-dimethylphenylphosphine oxide, bis(2-methyl-1-naphthoyl)-4-ethoxyphenylphosphine oxide, bis(2-methyl-1-naphthoyl)-2-naphthylphosphine oxide, bis (2-methyl-1-naphthoyl)-4-propylphenylphosphine oxide, bis (2-methyl-1-naphthoyl)-2,5-dimethylphenylphosphine oxide, bis(2-methoxy-1-naphthoyl)-4-ethoxyphenylphosphine oxide, bis(2-chloro-1-naphthoyl)-2,5-dimethylphenylphosphine oxide, and bis(2,6-dimethoxybenzoyl)-2,4,4-trimethylpentylphenylphosphine oxide.

Among them, as the acylphosphine oxide compound in the present invention, bis(2,4,6-trimethylbenzoyl)phenylphosphine oxide (IRGACURE 819: manufactured by Ciba Specialty Chemicals), bis(2,6-dimethoxybenzoyl)-2,4,4-trimethylpentylphenylphosphine oxide, 2,4,6-trimethylbenzoyidiphenylphosphine oxide (DAROCUR TPO: manufactured by Ciba Specialty Chemicals, LUCIRIN TPO: manufactured by BASF), etc. are preferable.

α-Aminoacetophenone Compound

One type of α-aminoacetophenone compound may be used on its own or two or more types thereof may be used.

As the α-aminoacetophenone compound, a compound represented by Formula (1) below may preferably be used.

(1)

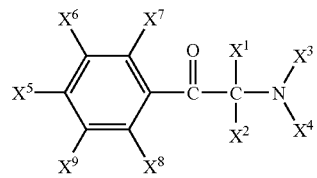

In the formula, $X^1$ denotes a group represented by (a), (b), or (c) below.

(a)

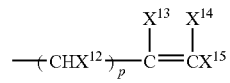

In the formula, p is 0 or 1.

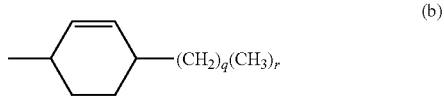
(b)

In the formula, q is an integer of 0 to 3 and r is 0 or 1.

(c)

In the formula, Y denotes a hydrogen atom, a halogen atom, an OH group, an alkyl group having at least 1 but no greater than 12 carbons (unless otherwise specified, the alkyl group means a straight chain or branched alkyl group, the same applies below), an alkoxy group having at least 1 but no greater than 12 carbons, an aromatic group, or a heterocyclic group. Preferred examples of the aromatic group include a phenyl group and a naphthyl group. Preferred examples of the heterocyclic group include a furyl group, a thienyl group, and a pyridyl group.

The alkyl group, alkoxy group, aromatic group, and heterocyclic group denoted by Y may have a substituent.

Examples of the substituent that the alkyl group denoted by Y may have include an OH group, a halogen atom, $-N(X^{10})_2$ ($X^{10}$ denotes a hydrogen atom, an alkyl group having at least 1 but no greater than 8 carbons, an alkenyl group having at least 3 but no greater than 5 carbons, a phenylalkyl group having at least 7 but no greater than 9 carbons, a hydroxyalkyl group having at least 1 but no greater than 4 carbons, or a phenyl group, and the two $X^{10}$s may be identical to or different from each other), an alkoxy group having at least 1 but no greater than 12 carbons, —COOR (R denotes an alkyl group having at least 1 but no greater than 18 carbons), —CO($OCH_2OCH_2)_n OCH_3$ (n denotes an integer of at least 1 but no greater than 20), and —OCOR (R denotes an alkyl group having at least 1 but no greater than 4 carbons).

Examples of the substituent that the alkoxy group denoted by Y may have include —COOR (R denotes an alkyl group having at least 1 but no greater than 18 carbons) and —CO($OCH_2CH_2)_n OCH_3$ (n denotes an integer of at least 1 but no greater than 20).

Examples of the substituent that the aromatic group or heterocyclic group denoted by Y may have include —($OCH_2CH_2)_n OH$ (n denotes an integer of at least 1 but no greater than 20), —($OCH_2CH_2)_n OCH_3$ (n denotes an integer of at least 1 but no greater than 20), an alkylthio group having at least 1 but no greater than 8 carbons, a phenoxy group, —COOR (R denotes an alkyl group having at least 1 but no greater than 18 carbons), —CO($OCH_2CH_2)_n OCH_3$ (n denotes an integer of at least 1 but no greater than 20), a phenyl group, and a benzyl group.

Two or more such substituents may be present if this is possible, and the substituent may further be substituted if this is possible.

Furthermore, in the formula, $X^{12}$ denotes a hydrogen atom, an alkyl group having at least 1 but no greater than 8 carbons, or a phenyl group. $X^{13}$, $X^{14}$, and $X^{15}$ independently denote a hydrogen atom or an alkyl group having at least 1 but no greater than 4 carbons. $X^{13}$ and $X^{14}$ may be bridged to form an alkylene group having at least 3 but no greater than 7 carbons.

In the formula, $X^2$ denotes the same group as for $X^1$ above, a cycloalkyl group having 5 or 6 carbons, an alkyl group having at least 1 but no greater than 12 carbons, or a phenyl group.

The alkyl group and phenyl group denoted by $X^2$ may have a substituent.

Examples of the substituent that the alkyl group denoted by $X^2$ may have include an alkoxy group having at least 1 but no greater than 4 carbons, a phenoxy group, a halogen atom, and a phenyl group.

Examples of the substituent that the phenyl group denoted by $X^2$ may have include a halogen atom, an alkyl group having at least 1 but no greater than 12 carbons, and an alkoxy group having at least 1 but no greater than 4 carbons.

Two or more such substituents may be present if this is possible, and the substituent may further be substituted if this is possible.

Furthermore, in the formula, $X^1$ and $X^2$ may be bridged to form a group represented by the formulae below.

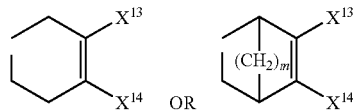

In the formula, $X^3$ denotes a hydrogen atom, an alkyl group having at least 1 but no greater than 12 carbons, an alkenyl group having at least 3 but no greater than 5 carbons, a cycloalkyl group having at least 5 but no greater than 12 carbons, or a phenylalkyl group having at least 7 but no greater than 9 carbons.

The alkyl group, alkenyl group, cycloalkyl group, and phenylalkyl group denoted by $X^3$ may have a substituent, and examples of the substituent include an OH group, an alkoxy group having at least 1 but no greater than 4 carbons, —CN, and —COOR (R denotes an alkyl group having at least 1 but no greater than 4 carbons).

In the formula, $X^4$ denotes an alkyl group having at least 1 but no greater than 12 carbons, an alkenyl group having at least 3 but no greater than 5 carbons, a cycloalkyl group having at least 5 but no greater than 12 carbons, a phenylalkyl group having at least 7 but no greater than 9 carbons, or a phenyl group.

The alkyl group, alkenyl group, cycloalkyl group, phenylalkyl group, and phenyl group denoted by $X^4$ may have a substituent.

Examples of the substituent that the alkyl group, alkenyl group, cycloalkyl group, and phenylalkyl group denoted by $X^4$ may have include an OH group, an alkoxy group having at least 1 but no greater than 4 carbons, —CN, and —COOR (R denotes an alkyl group having at least 1 but no greater than 4 carbons). When the alkyl group denoted by $X^4$ has a substituent, the number of carbons in the alkyl group that is substituted is preferably at least 2 but no greater than 4.

Examples of the substituent that the phenyl group denoted by $X^4$ may have include a halogen atom, an alkyl group having at least 1 but no greater than 12 carbons, an alkoxy group having at least 1 but no greater than 4 carbons, and —COOR (R denotes an alkyl group having at least 1 but no greater than 4 carbons).

Here, $X^2$ and $X^4$ may be bridged to form an alkylene group having at least 1 but no greater than 7 carbons, a phenylalkylene group having at least 7 but no greater than 10 carbons, an o-xylylene group, a 2-butenylene group, or an oxa- or aza-alkylene group having 2 or 3 carbons.

Furthermore, $X^3$ and $X^4$ may be bridged to form an alkylene group having at least 3 but no greater than 7 carbons.

The alkylene group formed by bridging $X^3$ and $X^4$ may have as a substituent an OH group, an alkoxy group having at least 1 but no greater than 4 carbons, or —COOR (R denotes alkyl having at least 1 but no greater than 4 carbons), or may contain in a bond —O—, —S—, —CO—, or —N($X^{16}$)— ($X^{16}$ denotes a hydrogen atom, an alkyl group having at least 1 but no greater than 12 carbons, or an alkyl group having at least 1 but no greater than 12 carbons and containing in a bonding chain one or more —O—, an alkenyl group having at least 3 but no greater than 5 carbons, a phenylalkyl group having at least 7 but no greater than 9 carbons, a hydroxyalkyl group having at least 1 but no greater than 4 carbons, —CH$_2$CH$_2$CN, —CH$_2$CH$_2$COOR (R denotes an alkyl group having at least 1 but no greater than 4 carbons), an alkanoyl group having at least 2 but no greater than 8 carbons, or a benzoyl group).

In the formula, $X^5$, $X^6$, $X^7$, $X^8$, and $X^9$ independently denote a hydrogen atom, a halogen atom, an alkyl group having at least 1 but no greater than 12 carbons, a cycloalkyl group having 5 or 6 carbons, a phenyl group, a benzyl group, a benzoyl group, an —O$X^{17}$ group, an —S$X^{18}$ group, an —SO—$X^{18}$ group, an —SO$_2$—$X^{18}$ group, an —N($X^{19}$)($X^{20}$) group, an —NH—SO$_2$—$X^{21}$ group, or a group represented by the formula below.

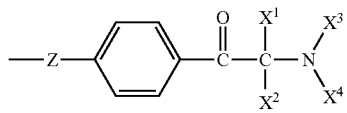

In the formula, Z denotes —O—, —S—, —N($X^{10}$)— $X^{11}$—N($X^{10}$)—, or a group represented by the formula below. $X^1$, $X^2$, $X^3$, and $X^4$ have the same meanings as defined for Formula (1).

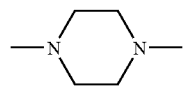

In the formula, $X^{10}$ is the same as described above, and $X^{11}$ denotes a straight chain or branched alkylene group having at least 2 but no greater than 16 carbons, or a straight chain or branched alkylene group having at least 2 but no greater than 16 carbons in which at least one —O—, —S—, or —N($X^{10}$)— is present in the chain ($X^{10}$ is the same as above).

$X^{17}$ denotes a hydrogen atom, an alkyl group having at least 1 but no greater than 12 carbons, —(CH$_2$CH$_2$O)$_n$H (n is an integer of at least 2 but no greater than 20), an alkanoyl group having at least 2 but no greater than 8 carbons, an alkenyl group having at least 3 but no greater than 12 carbons, a cyclohexyl group, a hydroxycyclohexyl group, a phenyl group, a phenylalkyl group having at least 7 but no greater than 9 carbons, or —Si(R$^4$)$_r$(R$^5$)$_{3-r}$ (R$^4$ is an alkyl group having at least 1 but no greater than 8 carbons, R$^5$ is a phenyl group, and r is 1, 2, or 3).

The alkyl group and phenyl group denoted by $X^{17}$ may have a substituent.

Examples of the substituent that the alkyl group denoted by $X^{17}$ may have include —CN, —OH, an alkoxy group having at least 1 but no greater than 4 carbons, an alkenyloxy group having at least 3 but no greater than 6 carbons, —OCH$_2$CH$_2$CN, —CH$_2$CH$_2$COOR (R denotes an alkyl group having at least 1 but no greater than 4 carbons), —COOH, or —COOR (R denotes an alkyl group having at least 1 but no greater than 4 carbons). Furthermore, when the alkyl group denoted by $X^{17}$ has a substituent, the number of carbons of the alkyl group that is substituted is preferably at least 1 but no greater than 6.

Examples of the substituent that the phenyl group denoted by $X^{17}$ may have include a halogen atom, an alkyl group having at least 1 but no greater than 12 carbons, or an alkoxy group having at least 1 but no greater than 4 carbons.

$X^{18}$ denotes a hydrogen atom, an alkyl group having at least 1 but no greater than 12 carbons, an alkenyl group having at least 3 but no greater than 12 carbons, a cyclohexyl group, a phenyl group, or a phenylalkyl group having at least 7 but no greater than 9 carbons.

The alkyl group and phenyl group denoted by $X^{18}$ may have a substituent.

Examples of the substituent that the alkyl group denoted by $X^{18}$ may have include —SH, —OH, —CN, —COOR (R denotes an alkyl group having at least 1 but no greater than 4 carbons), an alkoxy group having at least 1 but no greater than 4 carbons, —OCH$_2$CH$_2$CN, or —OCH$_2$CH$_2$COOR (R denotes alkyl having at least 1 but no greater than 4 carbons).

Examples of the substituent that the phenyl group denoted by $X^{18}$ may have include a halogen atom, an alkyl group having at least 1 but no greater than 12 carbons, or an alkoxy group having at least 1 but no greater than 4 carbons.

$X^{19}$ and $X^{20}$ independently denote a hydrogen atom; an alkyl group having at least 1 but no greater than 12 carbons; a hydroxyalkyl group having at least 2 but no greater than 4 carbons; an alkoxyalkyl group having at least 2 but no greater than 10 carbons; an alkenyl group having at least 3 but no greater than 5 carbons; a cycloalkyl group having at least 5 but no greater than 12 carbons; a phenylalkyl group having at least 7 but no greater than 9 carbons; a phenyl group; a phenyl group substituted with a halogen atom, an alkyl group having at least 1 but no greater than 12 carbons, or an alkoxy group having at least 1 but no greater than 4 carbons; an alkanoyl group having 2 or 3 carbons; or a benzoyl group. Furthermore, $X^{19}$ and $X^{20}$ may be bridged to form an alkylene group having at least 2 but no greater than 8 carbons, an alkylene group having at least 2 but no greater than 8 carbons that is substituted with an OH group, an alkoxy group having at least 1 but no greater than 4 carbons, or a —COOR (R is alkyl group having at least 1 but no greater than 4 carbons); or an alkylene group having at least 2 but no greater than 8 carbons that contains in the bonding chain —O—, —S—, or —N($X^{16}$)— ($X^{16}$ is the same as above).

$X^{21}$ denotes an alkyl group having at least 1 but no greater than 18 carbons; a phenyl group; a naphthyl group; or a phenyl group or naphthyl group substituted with a halogen atom, an alkyl group having at least 1 but no greater than 12 carbons, or an alkoxy group having at least 1 but no greater than 8 carbons.

Formula (1) is preferably represented by Formula (d).

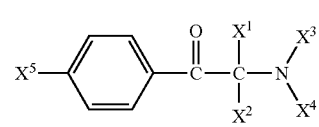

In Formula (d), $X^1$ and $X^2$ independently denote a methyl group, an ethyl group, or a benzyl group, —N$X^3X^4$ denotes a dimethylamino group, a diethylamino group, or a morpholino group, and $X^5$ denotes a hydrogen atom, an alkyl group having at least 1 but no greater than 8 carbons, an alkoxy group having at least 1 but no greater than 8 carbons, an alkylthio group having at least 1 but no greater than 8 carbons, a dimethylamino group, or a morpholino group. The benzyl group may be substituted with an alkyl group having at least 1 but no greater than 4 carbons.

Among them, it is preferable that $X^1$ and $X^2$ independently denote a methyl group, an ethyl group, or a benzyl group that may be substituted with an alkyl group having at least 1 but no greater than 4, —$NX^3X^4$ is a dimethylamino group or a morpholino group, and $X^5$ is an alkylthio group having 1 to 4 carbons or a morpholino group.

Furthermore, as the α-aminoacetophenone compound, an acid adduct salt of the compound represented by Formula (1) above may be used.

Moreover, examples of commercial α-aminoacetophenone compounds include polymerization initiators available under the product names IRGACURE 907, IRGACURE 369, and IRGACURE 379 from Ciba Specialty Chemicals, and they may be used suitably.

Specific examples of the α-aminoacetophenone compound include the compounds below.

That is, there are 2-dimethylamino-2-methyl-1-phenylpropan-1-one, 2-diethylamino-2-methyl-1-phenylpropan-1-one, 2-methyl-2-morpholino-1-phenylpropan-1-one, 2-dimethylamino-2-methyl-1-(4-methylphenyl)propan-1-one, 2-dimethylamino-1-(4-ethylphenyl)-2-methylpropan-1-one, 2-dimethylamino-1-(4-isopropylphenyl)-2-methylpropan-1-one, 1-(4-butylphenyl)-2-dimethylamino-2-methylpropan-1-one, 2-dimethylamino-1-(4-methoxyphenyl)-2-methylpropan-1-one, 2-dimethylamino-2-methyl-1-(4-methylthiophenyl)propan-1-one, 2-methyl-1-(4-methylthiophenyl)-2-morpholinopropan-1-one (IRGACURE 907), 2-benzyl-2-dimethylamino-1-(4-morpholinophenyl)butan-1-one (IRGACURE 369), 2-benzyl-2-dimethylamino-1-(4-dimethylaminophenyl)butan-1-one, and 2-dimethylamino-2-[(4-methylphenyl)methyl]-1-[4-(4-morpholinyl)phenyl]-1-butanone (IRGACURE 379).

Other Polymerization Initiator

The photocurable composition and the ink composition of the present invention may comprise another photopolymerization initiator. The polymerization initiator preferably comprises a radical polymerization initiator.

A photopolymerization initiator known to a person skilled in the art may be used without limitation, and many specific examples thereof are described in Bruce M. Monroe et al., Chemical Reviews, 93, 435 (1993), R. S. Davidson, Journal of Photochemistry and Biology A: Chemistry, 73, 81 (1993), J. P. Faussier "Photoinitiated Polymerization-Theory and Applications": Rapra Review, Vol. 9, Report, Rapra Technology (1998), and M. Tsunooka et al., Prog. Polym. Sci., 21, 1 (1996). Furthermore, many compounds utilized in chemically amplified photoresists and cationic photopolymerization, etc. are described in 'Imejingu yo Yukizairyou' (Organic Materials for Imaging) Ed. Japanese Research Association for Organic Electronics Materials, Bunshin Publishing Co. (1993), pp. 187-192. Moreover, a group of compounds are known, as described in F. D. Saeva, Topics in Current Chemistry, 156, 59 (1990), G. G. Maslak, Topics in Current Chemistry, 168, 1 (1993), H. B. Shuster et al., JACS, 112, 6329 (1990), I. D. F. Eaton et al., JACS, 102, 3298 (1980), etc., that cause oxidative or reductive bond cleavage via interaction with an electronic excited state of a sensitizing dye.

(C) Compound Represented by Formula (I)

In the present invention, the photocurable composition comprises the compound represented by Formula (I) (compound (I)). It is preferable that the compound (I) functions as a sensitizer and does not function as a polymerization initiator.

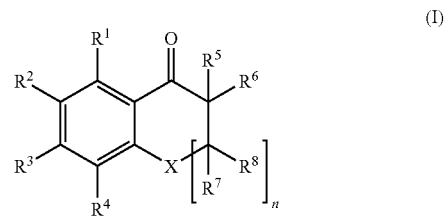

In Formula (I) above, X denotes O, S, or NR. n denotes 0 or 1. R denotes a hydrogen atom, an alkyl group, or an acyl group. $R^1$, $R^2$, $R^3$, $R^4$, $R^5$, $R^6$, $R^7$, and $R^8$ independently denote a hydrogen atom or a monovalent substituent.

In Formula (I) above, X denotes O, S, or NR, and here R denotes a hydrogen atom, an alkyl group, or an acyl group. n denotes 0 or 1.

X is preferably O or S, and more preferably S.

n denotes 0 or 1. Here, when n is 0, the carbon atom bonded to $R^7$ and $R^8$ is not present, and X, comprising a heteroatom, and the carbon atom bonded to $R^5$ and $R^6$ are directly bonded to each other, thus forming a five-membered heterocycle containing X.

$R^1$, $R^2$, $R^3$, $R^4$, $R^5$, $R^6$, $R^7$, and $R^8$ independently denote a hydrogen atom or a monovalent substituent.

When $R^1$, $R^2$, $R^3$, $R^4$, $R^5$, $R^6$, $R^7$, and $R^8$ denote a monovalent substituent, examples of the monovalent substituent include a halogen atom, an aliphatic group (e.g. an acyclic or cyclic hydrocarbon group such as an alkyl group, an alkenyl group, an alkynyl group, a cycloalkyl group, or a cycloalkenyl group), an aromatic group, a heterocyclic group, a cyano group, a hydroxy group, a nitro group, an amino group, an alkylamino group, a dialkylamino group, an alkoxy group, an aryloxy group, an amide group, an arylamino group, an ureido group, a sulfamoylamino group, an alkylthio group, an arylthio group, an alkoxycarbonylamino group, a sulfonamide group, a carbamoyl group, a sulfamoyl group, a sulfonyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a sulfinyl group, a phosphonyl group, an acyl group, a carboxyl group, and a sulfo group; among them an alkoxy group, an alkyl group, and a halogen atom are preferable, and an alkyl group and a halogen atom are more preferable.

These monovalent substituents may be further substituted with the above-mentioned substituent. For example, an alkyl group may be substituted with a halogen atom to form a haloalkyl group or may be substituted with a carboxyl group to form a carboxyalkyl group.

When $R^1$, $R^2$, $R^3$, $R^4$, $R^5$, $R^6$, $R^7$, and $R^8$ in Formula (I) denote a monovalent substituent, preferred examples of the alkyl group include those having 1 to 4 carbons such as a methyl group, an ethyl group, a propyl group, an n-butyl group, a sec-butyl group, and a t-butyl group.

Similarly, preferred examples of the alkoxy group include those having 1 to 4 carbons such as a methoxy group, an ethoxy group, a hydroxyethoxy group, a propoxy group, an n-butoxy group, an isobutoxy group, a sec-butoxy group, and a t-butoxy group.

Examples of the halogen atom include a fluorine atom, a chlorine atom, a bromine atom, and an iodine atom.

Examples of sensitizers that can be suitably used include sensitizers represented by Formula (I-A) below.

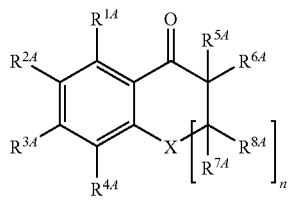

(I-A)

In Formula (I-A) above, X denotes O or S. n denotes 0 or 1. $R^{1A}$, $R^{2A}$, $R^{3A}$, $R^{4A}$, $R^{5A}$, $R^{6A}$, $R^{7A}$, and $R^{8A}$ independently denote a hydrogen atom, a halogen atom, an alkyl group (preferably one having 1 to 6 carbons and more preferably one having 1 to 4 carbons), a hydroxy group, a cyano group, a nitro group, an amino group, an alkylamino group (preferably one having 1 to 6 carbons and more preferably one having 1 to 4 carbons), a dialkylamino group (preferably one having 2 to 12 carbons and more preferably one having 2 to 8 carbons), an alkylthio group (preferably one having 1 to 6 carbons and more preferably one having 1 to 4 carbons), an alkoxy group (preferably one having 1 to 6 carbons and more preferably one having 1 to 4 carbons), an alkoxycarbonyl group (preferably one having 2 to 6 carbons and more preferably one having 2 to 4 carbons), an acyloxy group (preferably one having 1 to 6 carbons and more preferably one having 1 to 4 carbons), an acyl group (preferably one having 1 to 6 carbons and more preferably one having 1 to 4 carbons), a carboxyl group, or a sulfo group.

These monovalent substituents may be further substituted with the above-mentioned substituent. For example, an alkyl group may be substituted with a halogen atom to form a haloalkyl group or may be substituted with a carboxyl group to form a carboxyalkyl group.

Examples of the compound (I) that can be suitably used include sensitizers represented by Formula (I-B) below.

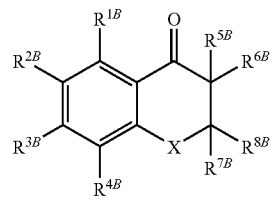

(I-B)

In Formula (I-B) above, X denotes O or S. $R^{1B}$, $R^{2B}$, $R^{3B}$, $R^{4B}$, $R^{5B}$, $R^{6B}$, $R^{7B}$, and $R^{8B}$ independently denote a hydrogen atom, a halogen atom, an alkyl group (preferably one having 1 to 6 carbons and more preferably one having 1 to 4 carbons), a hydroxy group, a cyano group, a nitro group, an amino group, an alkylamino group (preferably one having 1 to 6 carbons and more preferably one having 1 to 4 carbons), a dialkylamino group (preferably one having 2 to 12 carbons and more preferably one having 2 to 8 carbons), an alkylthio group (preferably one having 1 to 6 carbons and more preferably one having 1 to 4 carbons), an alkoxy group (preferably one having 1 to 6 carbons and more preferably one having 1 to 4 carbons), an alkoxycarbonyl group (preferably one having 2 to 6 carbons and more preferably one having 2 to 4 carbons), an acyloxy group (preferably one having 1 to 6 carbons and more preferably one having 1 to 4 carbons), an acyl group (preferably one having 1 to 6 carbons and more preferably one having 1 to 4 carbons), a carboxyl group, or a sulfo group.

These monovalent substituents may be further substituted with the above-mentioned substituent. For example, an alkyl group may be substituted with a halogen atom to form a haloalkyl group or may be substituted with a carboxyl group to form a carboxyalkyl group.

Examples of the compound (I) that can be suitably used include sensitizers represented by Formula (I-C) below.

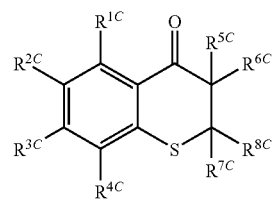

(I-C)

In Formula (I-C) above, $R^{1C}$, $R^{2C}$, $R^{3C}$, $R^{4C}$, $R^{5C}$, $R^{6C}$, $R^{7C}$, and $R^{8C}$ independently denote a hydrogen atom, a halogen atom, an alkyl group (preferably one having 1 to 6 carbons and more preferably one having 1 to 4 carbons), a hydroxy group, a cyano group, a nitro group, an amino group, an alkylthio group (preferably one having 1 to 6 carbons and more preferably one having 1 to 4 carbons), an alkylamino group (preferably one having 1 to 6 carbons and more preferably one having 1 to 4 carbons), an alkoxy group (preferably one having 1 to 6 carbons and more preferably one having 1 to 4 carbons), an alkoxycarbonyl group (preferably one having 2 to 6 carbons and more preferably one having 2 to 4 carbons), an acyloxy group (preferably one having 1 to 6 carbons and more preferably one having 1 to 4 carbons), an acyl group (preferably one having 1 to 6 carbons and more preferably one having 1 to 4 carbons), a carboxyl group, or a sulfo group.

These monovalent substituents may be further substituted with the above-mentioned substituent. For example, an alkyl group may be substituted with a halogen atom to form a haloalkyl group or may be substituted with a carboxyl group to form a carboxyalkyl group.

Specific examples (compound examples (I-1) to (I-96)) of the compound represented by Formula (I) suitably used in the present invention are listed below, but the present invention is not limited thereto. In the present invention, in some of the structural formulae a hydrocarbon chain is represented by a simplified structural formula in which symbols for carbon (C) and hydrogen (H) are omitted. Me denotes a methyl group, $Bu^t$ denotes a tert-butyl group, and $Pr^i$ denotes an isopropyl group.

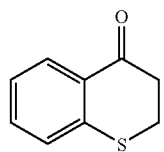

(I-1)

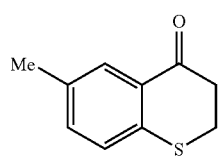 (I-2)
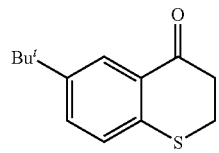 (I-3)
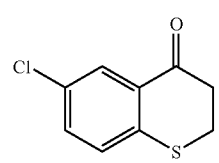 (I-4)
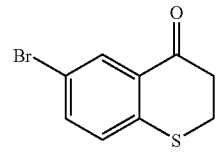 (I-5)
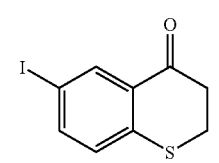 (I-6)
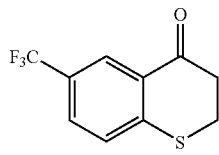 (I-7)
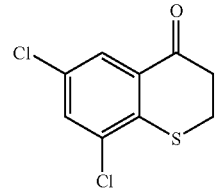 (I-8)
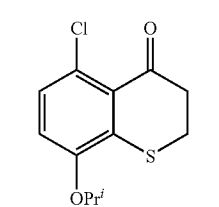 (I-9)
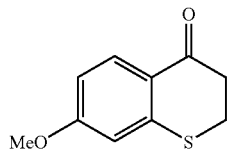 (I-10)
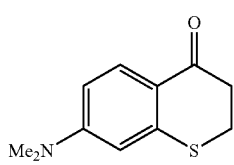 (I-11)
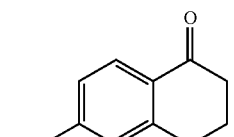 (I-12)
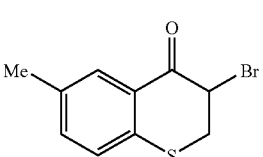 (I-13)
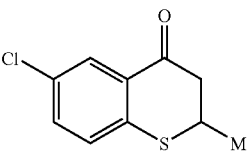 (I-14)
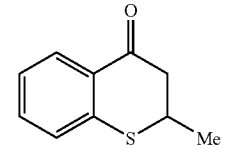 (I-15)
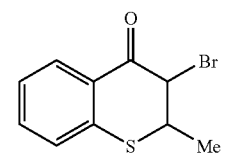 (I-16)
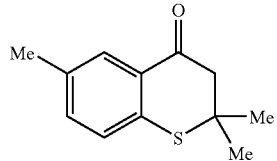 (I-17)
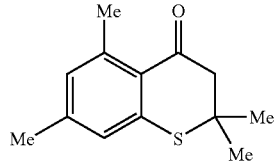 (I-18)
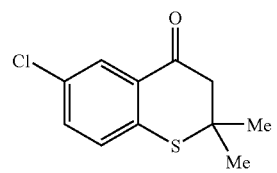 (I-19)

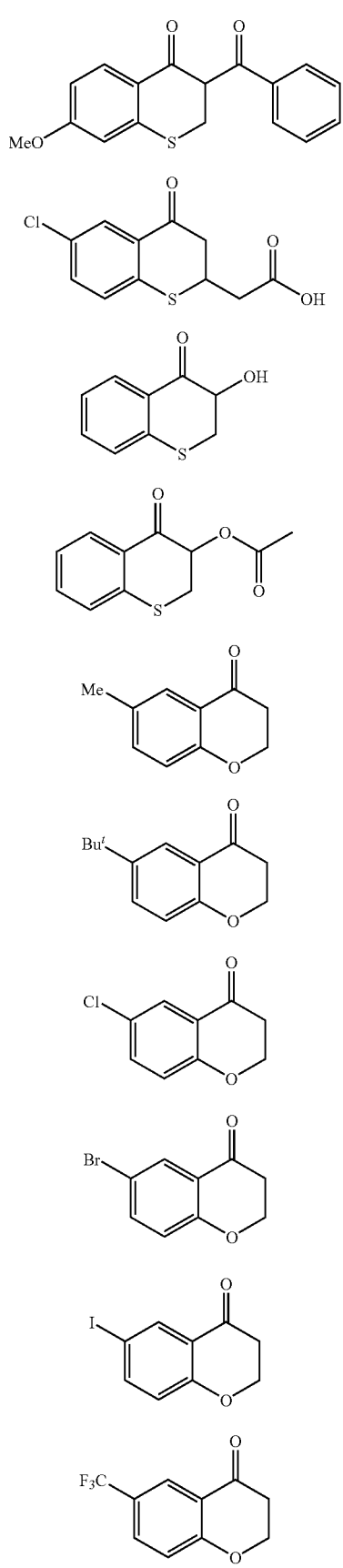
(I-20)
(I-21)
(I-22)
(I-23)
(I-24)
(I-25)
(I-26)
(I-27)
(I-28)
(I-29)
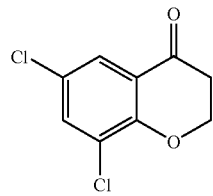
(I-30)
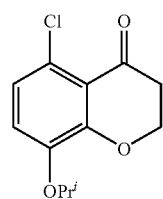
(I-31)
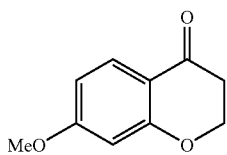
(I-32)
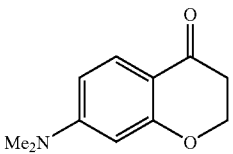
(I-33)
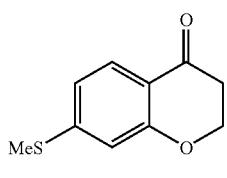
(I-34)
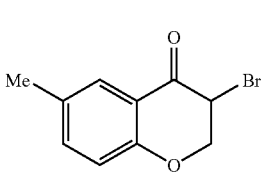
(I-35)
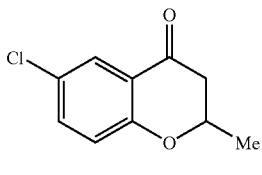
(I-36)
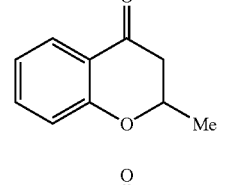
(I-37)
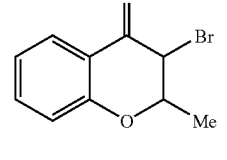
(I-38)

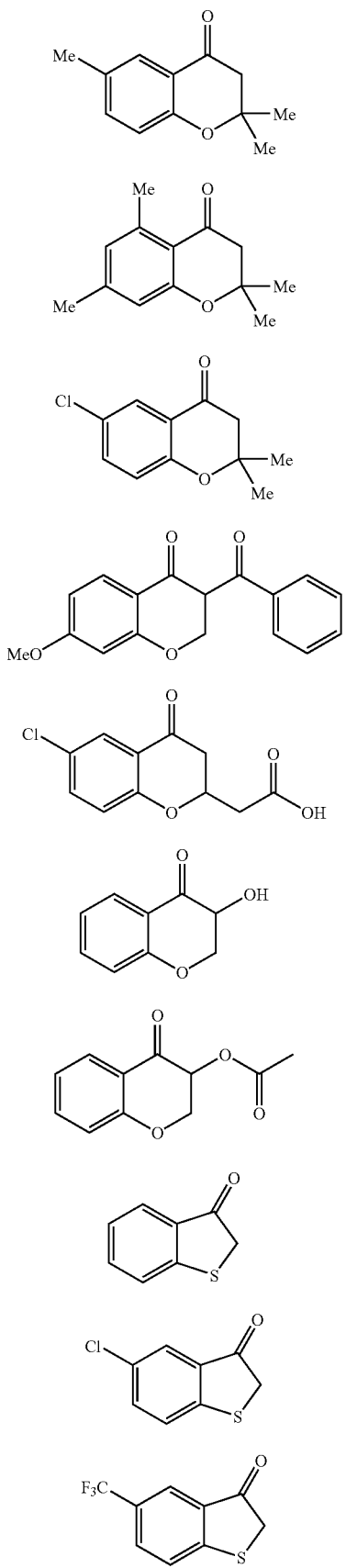
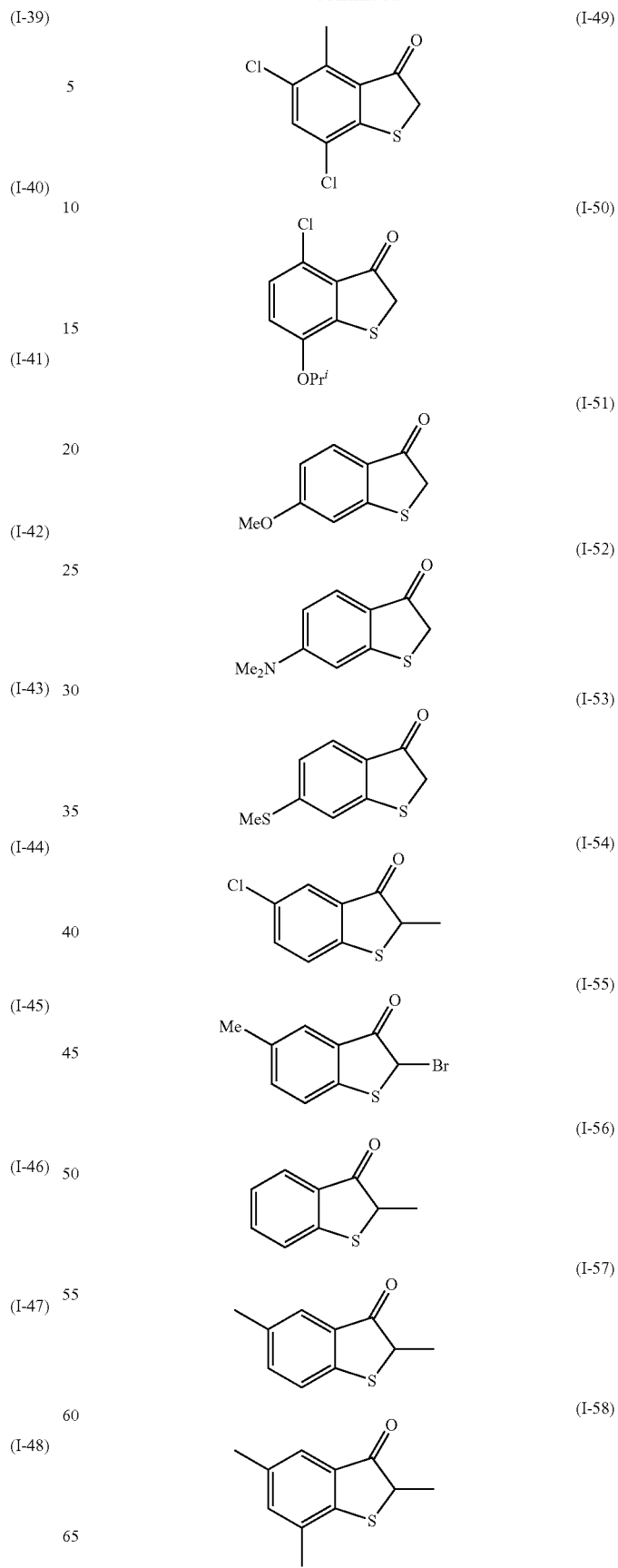

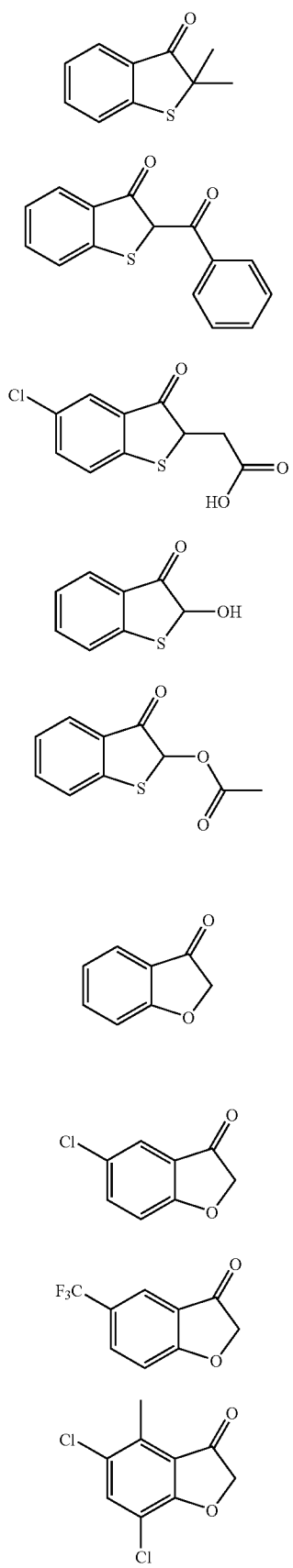
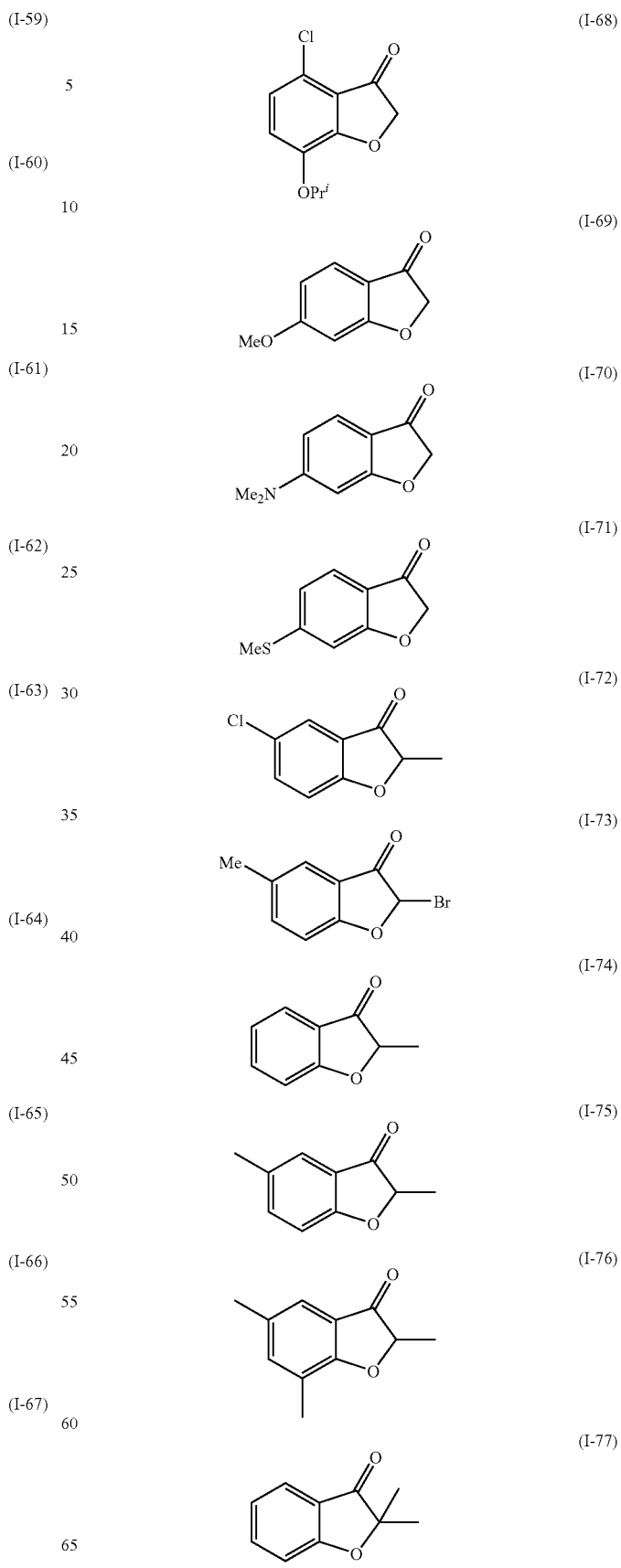

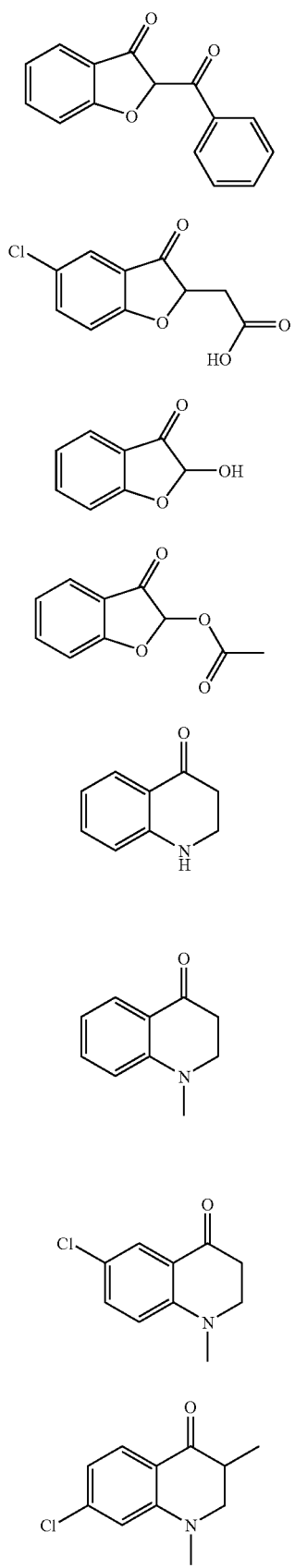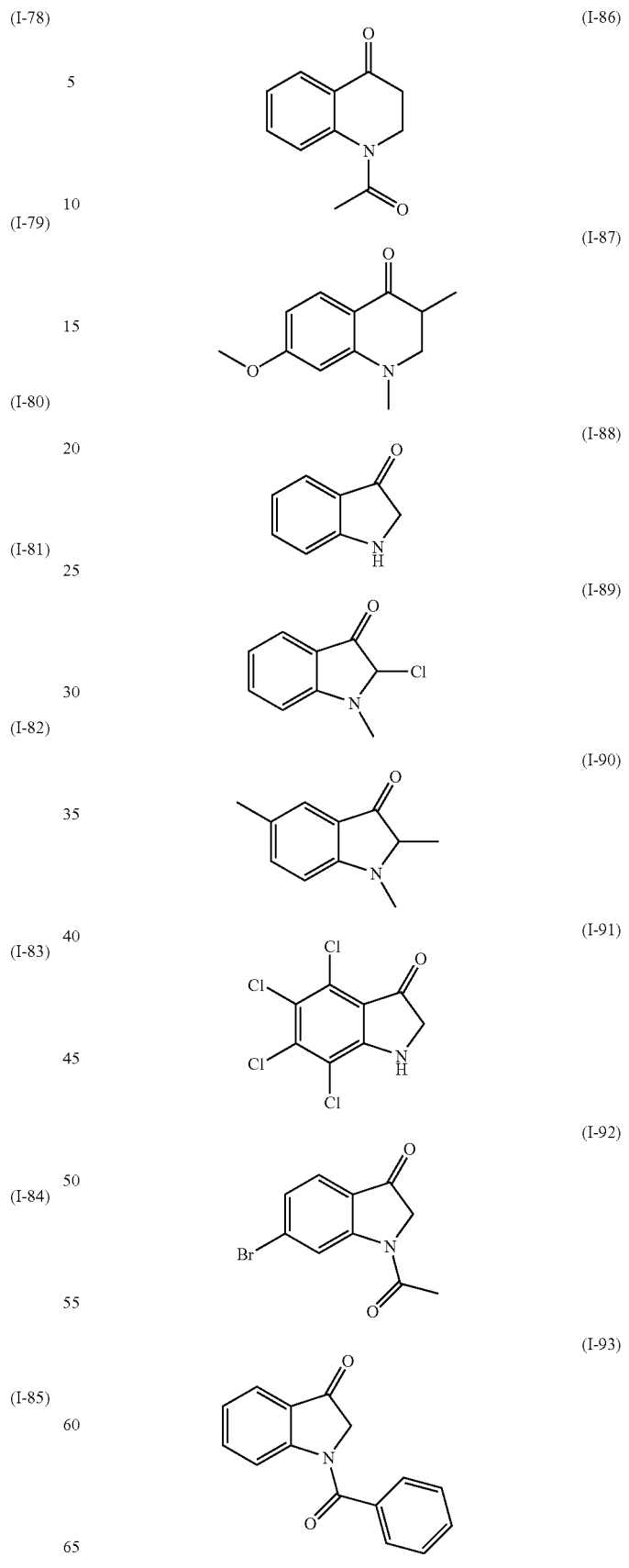

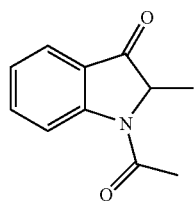
(I-94)

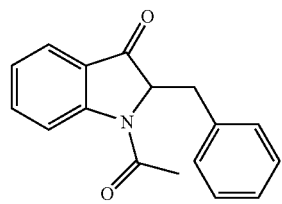
(I-95)

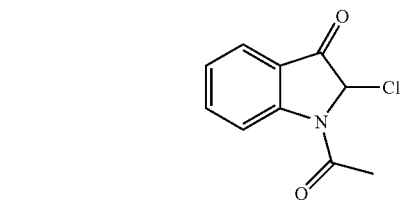
(I-96)

The compound represented by Formula (I) above may be synthesized by a known method described in, for example, JP-A-2004-189695, Tetrahedron, Vol. 49, p. 939 et seq., 1993, Journal of Organic Chemistry, p. 893 et seq., 1945, Journal of Organic Chemistry, p. 4939 et seq., 1965, etc.

(D) Amine Compound

In the present invention, the photocurable composition comprises an amine compound. As the amine compound used in the present invention, a tertiary amine compound (having a tertiary amine structure) is preferable. The use of a tertiary amine compound enables the degree of polymerization on the surface to be improved more effectively, and enables exudation of a non-curing component and blocking to be suppressed.

Furthermore, from the viewpoint of long-term storage stability of the photocurable composition, prevention of discoloration, and prevention of exudation of a non-curing component from a cured coating, the amine compound is preferably a tertiary amine compound having a polymerizable unsaturated bond, and particularly preferably a tertiary amine compound having a polymerizable unsaturated bond and a cyclic amine structure.

A 'compound having a polymerizable unsaturated bond and a cyclic amine structure in the molecule (specific cyclic amine compound)' that can be used particularly preferably in the present invention as the amine compound is explained in detail below.

Specific Cyclic Amine Compound

As the polymerizable unsaturated bond that the compound has, a double bond or a triple bond can be cited, and a radically polymerizable double bond is preferable. That is, the amine compound preferably has an ethylenically unsaturated bond. From the viewpoint of forming a low viscosity composition suitable as an inkjet recording ink composition and obtaining a flexible cured coating in image formation, the number of polymerizable unsaturated bonds, that the specific cyclic amine compound has is preferably 1 to 3, more preferably 1 to 2, and particularly preferably 1.

Examples of preferred functional groups containing an ethylenically unsaturated bond include a (meth)acryloyl group, an allyl group, a styryl group, and a vinyloxy group; from the viewpoint of the curing sensitivity of the ink composition, a (meth)acryloyl group is preferable, and an acryloyl group is particularly preferable. The (meth)acryloyl group referred to here means either an acryloyl group or a methacryloyl group or both thereof.

The cyclic amine structure may be used without particular restriction as long as it is a cyclic amine structure in which at least one of the atoms forming the ring structure is a nitrogen atom.

The number of members of the ring of the ring structure is preferably 3 to 7, more preferably 4 to 7, and particularly preferably 5 to 6.

Bonds forming the ring structure may be single bonds or double bonds, but they are preferably single bonds. When the bonds are single bonds, that is, the cyclic amine structure thus formed is an alicyclic structure, the effect of improving curing speed, particularly the effect in suppressing inhibition of polymerization by oxygen when curing is carried out in air, becomes prominent and this has the advantage of giving high curability.

The number of nitrogen atoms contained in the ring structure is preferably 1 to 3, and more preferably 1 to 2, and a structure having only one nitrogen atom in the ring structure is particularly preferable.

The ring forming the cyclic amine structure may have a substituent where introduction is possible. Examples of a preferred substituent include an alkyl group having a relatively short chain with on the order of 1 to 4 carbons; a methyl group or an ethyl group is more preferable, and a methyl group is particularly preferable.

Furthermore, in addition to a nitrogen atom, a hetero atom such as an oxygen atom or a sulfur atom may be contained as a constituent forming the ring of the cyclic amine structure.

Among the cyclic amine structures, a pyrrolidine ring, a piperidine ring, and a morpholine ring are particularly preferable, and a piperidine ring having a substituent and being represented by Formula (1) below can be cited as a particularly preferable example.

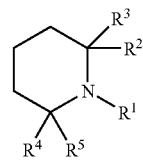
(1)

In Formula (1), $R^1$ denotes a straight-chain alkyl group or a substituted alkyl group.

$R^1$ is an alkyl group having at least 1 carbon, preferably an alkyl group having 1 to 20 carbons, more preferably an alkyl group having 1 to 12 carbons, and particularly preferably an alkyl group having 1 to 4 carbons. Preferred specific examples of the alkyl group include a methyl group, an ethyl group, an n-butyl group, an n-hexyl group, and an n-nonyl group; a methyl group, an ethyl group, and a butyl group are more preferable, and a methyl group is particularly preferable. Moreover, it is preferable to have a hydrogen atom on a carbon atom adjacent to the nitrogen atom, and the number of hydrogen atoms is preferably 2 or greater.

When $R^1$ is a substituted alkyl group, examples of a substituent that can be introduced include an alkyl group (preferably one having 1 to 20 carbons, more preferably one having 1 to 12 carbons, and yet more preferably one having 1 to 4 carbons), an alkoxy group (preferably one having 1 to 20 carbons, more preferably one having 1 to 12 carbons, and yet more preferably one having 1 to 4 carbons), an aryl group (preferably one having 6 to 20 carbons, and more preferably one having 6 to 12 carbons), an aryloxy group (preferably one having 6 to 20 carbons, and more preferably one having 6 to 12 carbons), an acyl group (preferably one having 1 to 20 carbons, more preferably one having 1 to 12 carbons, and yet more preferably one having 1 to 4 carbons), an amino group, a hydroxy group, a cyano group, a nitro group, and a halogen atom.

$R^2$ to $R^5$ independently denote a methyl group or an ethyl group; a methyl group is preferable, and it is particularly preferable for all of $R^2$ to $R^5$ to be methyl groups.

In the specific cyclic amine compound, the cyclic amine structure is linked to a polymerizable unsaturated bond via a linking group, and with regard to the linking site, any site may be linked to the polymerizable unsaturated bond as long as it is not a site where $R^2$ to $R^5$ in Formula (I) above, which is a cyclic amine structure, are present.

Specific examples of the specific cyclic amine compound include compounds represented by Formulae (2), (3), and (4) below, that is, compounds in which a polymerizable double bond is bonded to a cyclic amine structure via a predetermined linking group.

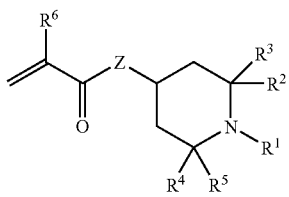

(2)

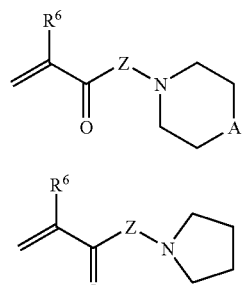

(3)

(4)

In Formulae (2) to (4), $R^1$ to $R^5$ have the same meanings as those of $R^1$ to $R^5$ in Formula (I), and preferred ranges are also the same.

$R^6$ denotes a methyl group or a hydrogen atom, and a hydrogen atom is preferable.

Z denotes a divalent linking group or a single bond, and is preferably an oxygen atom or an alkylene group formed by removing a hydrogen atom from an alkyl group denoted by $R^1$ above, is more preferably an alkylene group having 1 to 20 carbons, and is particularly preferably an alkylene group having 3 to 12 carbons.

The alkylene group denoted by Z may have a divalent group selected from —CO—, —O—, —S—, or —$NR^7$— in a methylene chain comprising a methylene group (—$CH_2$—), and is preferably one having an ether bond (—O—) in an alkylene chain comprising a methylene group. Among them, one having an ether bond (—O—) at opposite ends of an alkylene group is particularly preferable.

Here, $R^7$ is a hydrogen atom or has the same meaning as that of $R^1$ above when $R^1$ is an alkyl group. When $R^7$ has the same meaning as that of $R^1$, a preferred range is also the same.

The alkylene group denoted by Z is particularly preferably an alkylene group having on the order of 3 to 12 carbons, and specific examples thereof include a propylene group, a butylene group, an octylene group, and a nonylene group. A chain structure comprising a methylene group in these alkylene groups may have a divalent group selected from —CO—, —O—, —S—, or —$NR^7$— as described above. These divalent linking groups may be a divalent linking group formed by combining two or more types thereof.

A denotes a divalent organic group, and is preferably a methylene group (—$CH_2$—) or an oxygen atom (—O—).

Specific examples [compound examples (A-1) to (A-26)] of specific cyclic amine compounds that can be used suitably in the present invention are listed below, but the present invention is not limited thereto. Furthermore, when there are stereoisomers for each compound example, any thereof may be used, or a mixture of stereoisomers may be used.

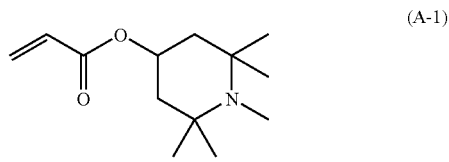

(A-1)

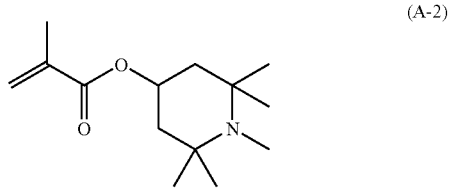

(A-2)

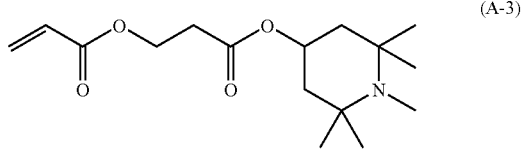

(A-3)

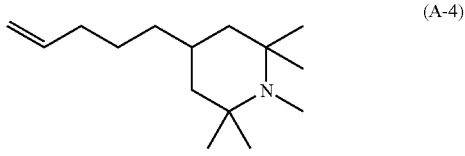

(A-4)

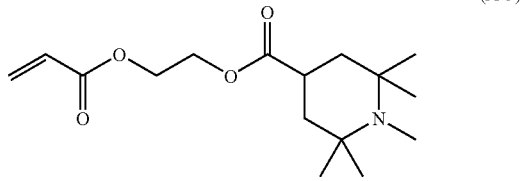

(A-5)

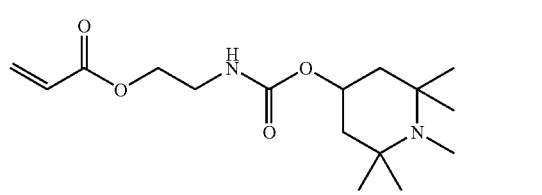

(A-6)

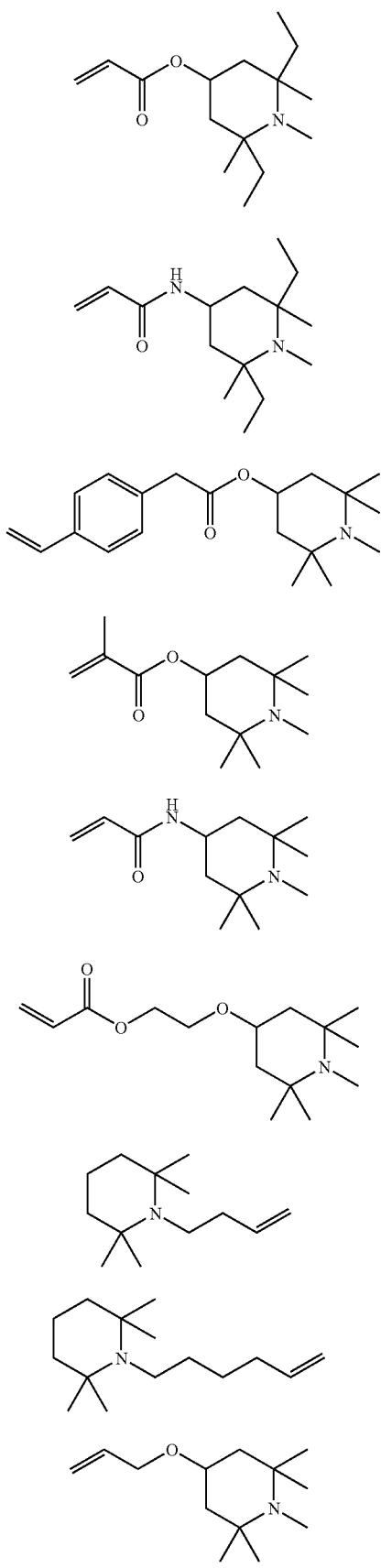
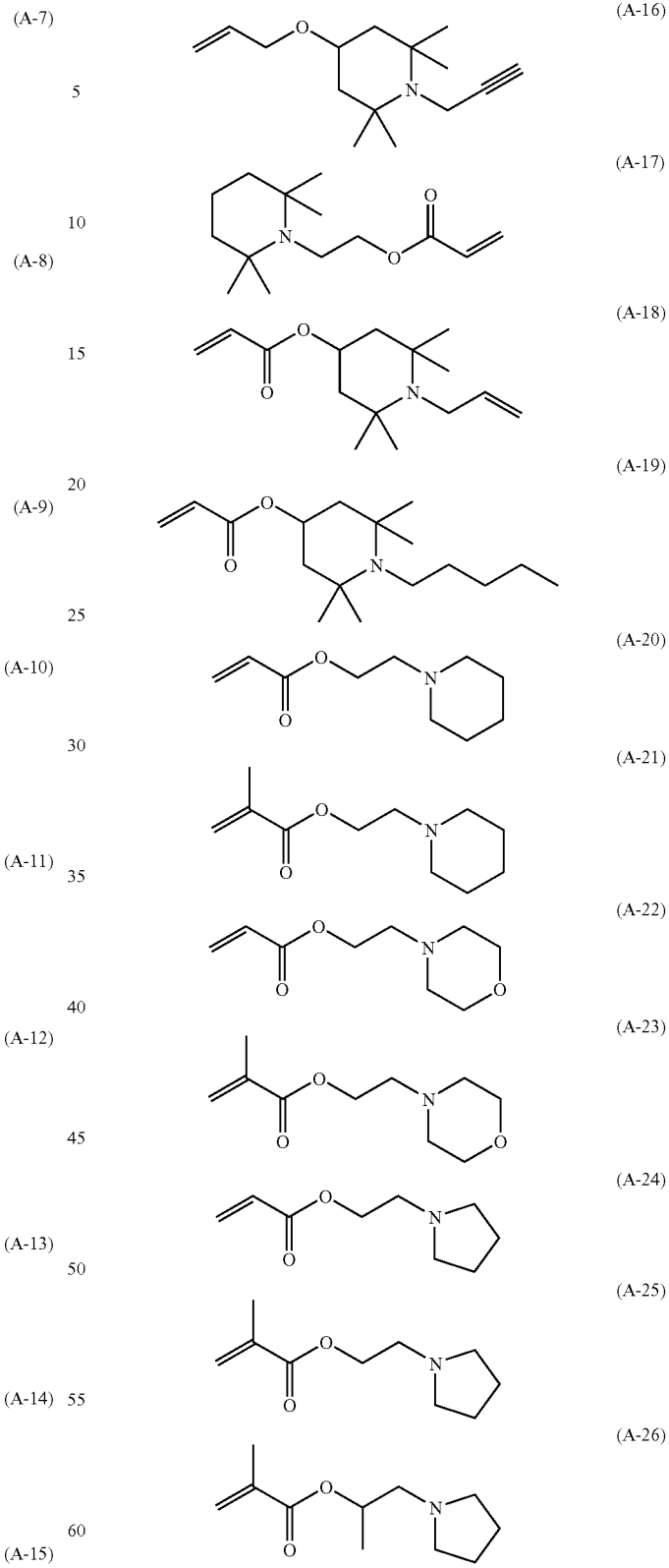
Among them, (A-1), (A-2), (A-3), (A-7), (A-12), (A-17), etc., which have a (meth)acryloyl group in the molecule, are preferable, (A-1) and (A-2) are more preferable, and (A-1) is particularly preferable.

The specific cyclic amine compound may be produced by a known synthetic method described in, for example, Makromolekulare Chemie., Vol. 181, No. 3, pp. 595 to 634 (1980), Journal of Applied Polymer Science, Vol. 69, No. 13, pp. 2649 to 2656 (1998), Journal of Applied Polymer Science, Vol. 75, No. 9, pp. 1103 to 1114 (2000), Polymers for Advanced Technologies, Vol. 13, pp. 247 to 253 (2002), or JP-A-3-251569, or may be available as a commercial product such as Fancryl FA-711MM (Hitachi Chemical Co., Ltd.).

(E) Colorant

When the photocurable composition of the present invention is used as an ink composition, it preferably comprises a colorant.

The colorant that can be used in the present invention is not particularly limited, and various known pigments and dyes may be selected appropriately according to an intended application. Among them, as a colorant, a pigment is particularly preferable from the viewpoint of excellent light fastness.

Pigments that are preferably used in the present invention are now described.

With regard to the pigments, there is no particular limitation, and any generally commercially available organic pigment and inorganic pigment, resin particles dyed with a dye, etc. may be used. Furthermore, a commercial pigment dispersion or a surface-treated pigment such as, for example, a dispersion of a pigment in an insoluble resin, etc. as a dispersion medium or a pigment having a resin grafted on the surface, etc. may be used as long as the effects of the present invention are not impaired.

Examples of these pigments include pigments described in, for example, 'Ganryo no Jiten (Pigment Dictionary)', Ed. by Seishiro Ito (2000), W. Herbst, K. Hunger, Industrial Organic Pigments, JP-A-2002-12607, JP-A-2002-188025, JP-A-2003-26978, and JP-A-2003-342503.

Specific examples of the organic pigment and the inorganic pigment that can be used in the present invention include, as those exhibiting a yellow color, monoazo pigments such as CI Pigment Yellow 1 (Fast Yellow G, etc.) and CI Pigment Yellow 74, disazo pigments such as CI Pigment Yellow 12 (Disazo Yellow AAA, etc.) and CI Pigment Yellow 17, benzidine-free azo pigments such as CI Pigment Yellow 180 and C.I. Pigment Yellow 200 (Novoperm Yellow 2HG), azo lake pigments such as CI Pigment Yellow 100 (Tartrazine Yellow Lake, etc.), condensed azo pigments such as CI Pigment Yellow 95 (Azo Condensation Yellow GR, etc.), acidic dye lake pigments such as CI Pigment Yellow 115 (Quinoline Yellow Lake, etc.), basic dye lake pigments such as CI Pigment Yellow 18 (Thioflavine Lake, etc.), anthraquinone pigments such as Flavanthrone Yellow (Y-24), isoindolinone pigments such as Isoindolinone Yellow 3RLT (Y-110), quinophthalone pigments such as Quinophthalone Yellow (Y-138), isoindoline pigments such as Isoindoline Yellow (Y-139), nitroso pigments such as CI Pigment Yellow 153 (Nickel Nitroso Yellow, etc.), and metal complex azomethine pigments such as CI Pigment Yellow 117 (Copper Azomethine Yellow, etc.).

Examples of pigments exhibiting a red or magenta color include monoazo pigments such as CI Pigment Red 3 (Toluidine Red, etc.), disazo pigments such as CI Pigment Red 38 (Pyrazolone Red B, etc.), azo lake pigments such as CI Pigment Red 53:1 (Lake Red C, etc.) and CI Pigment Red 57:1 (Brilliant Carmine 6B), condensed azo pigments such as CI Pigment Red 144 (Azo Condensation Red BR, etc.), acidic dye lake pigments such as CI Pigment Red 174 (Phloxine B Lake, etc.), basic dye lake pigments such as CI Pigment Red 81 (Rhodamine 6G' Lake, etc.), anthraquinone pigments such as CI Pigment Red 177 (Dianthraquinonyl Red, etc.), thioindigo pigments such as CI Pigment Red 88 (Thioindigo Bordeaux, etc.), perinone pigments such as CI Pigment Red 194 (Perinone Red, etc.), perylene pigments such as CI Pigment Red 149 (Perylene Scarlet, etc.), quinacridone pigments such as CI Pigment violet 19 (unsubstituted quinacridone, CINQUASIA Magenta RT-355T; manufactured by Ciba Specialty Chemicals) and CI Pigment Red 122 (Quinacridone Magenta, etc.), isoindolinone pigments such as CI Pigment Red 180 (Isoindolinone Red 2BLT, etc.), and alizarin lake pigments such as CI Pigment Red 83 (Madder Lake, etc.).

Examples of pigments exhibiting a blue or cyan color include disazo pigments such as CI Pigment Blue 25 (Dianisidine Blue, etc.), phthalocyanine pigments such as CI Pigment Blue 15 and CI Pigment Blue 15:3 (IRGALITE BLUE GLO; manufactured by Ciba Specialty Chemicals) (Phthalocyanine Blue, etc.), acidic dye lake pigments such as CI Pigment Blue 24 (Peacock Blue Lake, etc.), basic dye lake pigments such as CI Pigment Blue 1 (Victoria Pure Blue BO Lake, etc.), anthraquinone pigments such as CI Pigment Blue 60 (Indanthrone Blue, etc.), and alkali blue pigments such as CI Pigment Blue 18 (Alkali Blue V-5:1).

Examples of pigments exhibiting a green color include phthalocyanine pigments such as CI Pigment Green 7 (Phthalocyanine Green) and CI Pigment Green 36 (Phthalocyanine Green), and azo metal complex pigments such as CI Pigment Green 8 (Nitroso Green).

Examples of pigments exhibiting an orange color include isoindoline pigments such as CI Pigment Orange 66 (Isoindoline Orange) and anthraquinone pigments such as CI Pigment Orange 51 (Dichloropyranthrone Orange).

Examples of pigments exhibiting a black color include carbon black, titanium black, and aniline black. Examples of the carbon black include SPECIAL BLACK 250 (manufactured by Degussa).

Specific examples of white pigments that can be used include basic lead carbonate ($2PbCO_3Pb(OH)_2$, also known as silver white), zinc oxide ($ZnO$, also known as zinc white), titanium oxide ($TiO_2$, also known as titanium white), and strontium titanate ($SrTiO_3$, also known as titan strontium white).

Titanium oxide has, compared with other white pigments, a low specific gravity, a high refractive index, and is chemically and physically stable, and therefore has high hiding power and coloring power as a pigment and, furthermore, has excellent durability toward acids, alkalis, and other environments. It is therefore preferable to use titanium oxide as the white pigment. It is of course possible to use another white pigment (which can be any white pigment, in addition to the white pigments cited above) as necessary.

For dispersion of the colorant, for example, a dispersing machine such as a bead mill, a ball mill, a sand mill, an attritor, a roll mill, a jet mill, a homogenizer, a paint shaker, a kneader, an agitator, a Henschel mixer, a colloidal mill, an ultrasonic homogenizer, a pearl mill, or a wet type jet mill may be used.

When carrying out dispersion of the colorant, a dispersant such as a surfactant may be added.

Furthermore, when the colorant is added, as a dispersion adjuvant, it is also possible to use a synergist as necessary according to the various types of colorant. The dispersant and dispersion adjuvant are preferably used at least 1 part by weight but no greater than 50 parts by weight relative to 100 parts by weight of the colorant.

In the photocurable composition, a solvent may be added as a dispersion medium for various components such as the colorant, or the polymerizable compound, which is a low molecular weight component, may be used as a dispersion medium without using a solvent, and since the photocurable composition of the present invention and especially the ink composition of the present invention are preferably an actinic radiation curing type liquid and the ink composition is cured after being applied on top of a recording medium, it is preferable for it to be solvent-free. This is because, if solvent remains in the image formed from the cured ink composition, the solvent resistance is degraded and the VOC (Volatile Organic Compound) problem of residual solvent occurs. From this viewpoint, it is preferable to use the polymerizable compound as a dispersion medium and it is particularly preferable to select a polymerizable compound having the lowest viscosity in terms of improvement of dispersion suitability and handling properties of an ink composition.

Since excellent coloration is achieved by finer particles, it is preferable for the average particle size of the colorant used here to be at least 0.01 µm but no greater than 0.4 µm, and more preferably at least 0.02 µm but no greater than 0.2 µm. In order to make the maximum particle size be no greater than 3 µm, and preferably no greater than 1 µm, it is preferable for the colorant, the dispersant, and the dispersion medium to be selected, and dispersion conditions and filtration conditions to be set. By such control of particle size, clogging of a head nozzle can be suppressed, and the storage stability of the photocurable composition and the ink composition, and the transparency and curing sensitivity of the photocurable composition and the ink composition can be maintained. In the present invention, by using a dispersant having excellent dispersibility and stability, even when a microparticulate colorant is used, a uniform and stable dispersion is obtained.

The particle size of the colorant in the photocurable compound and the ink composition may be measured by a known measurement method. Specifically, it may be measured by a centrifugal sedimentation light transmission method, an X-ray transmission method, a laser diffraction/scattering method, or a dynamic light scattering method. In the present invention, a value obtained by measurement using the laser diffraction/scattering method is employed.

Surfactant

The photocurable composition of the present invention preferably comprises a surfactant. When using the photocurable composition of the present invention as the ink composition, it is particularly preferable that it comprises the surfactant.

The colored liquid and the undercoat liquid preferably comprise a surfactant, and it is more preferably that the undercoat liquid comprises a surfactant.

Examples of the surfactant used in the present invention include the surfactants below. For example, those described in JP-A-62-173463 and JP-A-62-183457 can be cited. Specific examples thereof include anionic surfactants such as dialkylsulfosuccinic acid salts, alkylnaphthalenesulfonic acid salts, and fatty acid salts, nonionic surfactants such as polyoxyethylene alkyl ethers, polyoxyethylene alkyl allyl ethers, acetylene glycols, and polyoxyethylene/polyoxypropylene block copolymers, and cationic surfactants such as alkylamine salts and quaternary ammonium salts. As the above known surfactants, an organofluoro compound may be used. The organofluoro compound is preferably hydrophobic. Examples of the organofluoro compound include fluorine-based surfactants, oil-like fluorine-based compounds (e.g. fluorine oils), and solid fluorine compound resins (e.g. tetrafluoroethylene resin), and those described in JP-B-57-9053 (8th to 17th columns) and JP-A-62-135826.

The surfactant used in the present invention is not particularly limited to the surfactants described above, and it may be an additive that, for the concentration added, is capable of reducing the surface tension efficiently.

Other Additives

The photocurable composition in the present invention may comprise, in addition to the polymerizable compound, the polymerization initiator, etc., various types of additive according to the intended purpose. For example, when the photocurable composition of the present invention is used as the ink composition, from the viewpoint of improving the weatherability of an image that is obtained, a UV absorber may be used. Furthermore, in order to improve the storage stability, an antioxidant may be added.

Moreover, it is possible to add various types of organic and metal complex antifading agents, a conductive salt such as potassium thiocyanate, lithium nitrate, ammonium thiocyanate, or dimethylamine hydrochloride for the purpose of controlling discharge physical properties, or a trace amount of an organic solvent in order to improve the adhesion between an ink composition and a substrate.

Furthermore, various types of high molecular weight compounds may be added in order to adjust coating physical properties. Examples of the high molecular weight compounds include acrylic polymers, polyvinylbutyral resins, polyurethane resins, polyamide resins, polyester resins, epoxy resins, phenolic resins, polycarbonate resins, polyvinylbutyral resins, polyvinylformal resins, shellac, vinylic resins, acrylic resins, rubber-based resins, waxes, and other natural resins. They may be used in a combination of two or more types.

In addition to the above, the composition may contain as necessary, for example, a leveling additive, a matting agent, a wax for adjusting coating physical properties, or a tackifier that does not inhibit polymerization in order to improve the adhesion to a polyolefin, PET, etc.

(3) Process for Producing Photocured Material and Photocuring Device, Inkjet Recording Method, Inkjet Recording Device and Printed Material Process for Producing Photocured Material and Photocuring Device The process for producing a photocured material of the present invention comprises irradiating the above-mentioned photocurable composition of the present invention with light having a light emission peak wavelength in the range of at least 340 nm but no greater than 400 nm.

A photocuring device that can be used suitably in the above-mentioned process for producing a photocured material is a photocuring device equipped with the photocurable composition of the present invention, and comprises at least a light source having a peak wavelength of 340 nm to 400 nm.

Inkjet Recording Method, Inkjet Recording Device, and Printed Material

The photocurable composition of the present invention is used suitably as an ink composition, and is used particularly suitably as an inkjet recording ink composition.

The inkjet recording method of the present invention is a method in which the photocurable composition (ink composition) of the present invention is discharged onto a recording medium (support, recording material, etc.) for inkjet recording, and the ink composition discharged onto the recording medium is irradiated with actinic radiation to thus cure the ink and form an image.

More specifically, the inkjet recording method of the present invention comprises ($a^1$) a step of discharging the photocurable composition of the present invention (ink composition) onto a recording medium, and ($b^1$) a step of irradiating the discharged ink composition with actinic radiation so as to cure the ink composition.

Furthermore, the actinic Radiation has a peak wavelength in the wavelength range of at least 340 nm but no greater than 400 nm.

Since the inkjet recording method of the present invention comprises steps ($a^1$) and ($b^1$) above, an image is formed by the ink composition cured on the recording medium.

Moreover, the printed material of the present invention is a printed material in which recording is carried out by the inkjet recording method of the present invention.

The step ($a^1$) of the inkjet recording method of the present invention may employ an inkjet recording device that will be described in detail below.

Inkjet Recording System

The inkjet recording system used in the inkjet recording method of the present invention is not particularly limited, and a known inkjet recording system that can achieve a target resolution may be freely selected and used. That is, any known inkjet recording system, including a commercial system, may be used for carrying out ink discharge onto a recording medium in step (a) of the inkjet recording method of the present invention.

Examples of the inkjet recording system that can be used in the present invention include a system that comprises an ink supply system, a temperature sensor, and an actinic radiation source.

The ink supply system comprises, for example, a main tank containing the ink composition of the present invention, a supply pipe, an ink supply tank immediately before an inkjet head, a filter, and a piezo type inkjet head. The piezo type inkjet head is driven so as to discharge multisize dots of preferably 1 to 100 pL, and more preferably 8 to 30 pL, at a resolution of preferably 320×320 to 4,000×4,000 dpi, more preferably 400×400 to 1,600×1,600, and particularly preferably 720×720 dpi. Here, dpi referred to in the present invention denotes the number of dots per 2.54 cm.

As described above, since for a radiation-curing ink, such as the ink composition of the present invention, the temperature of the discharged ink is desirably constant, the inkjet recording device is preferably equipped with means for stabilizing the temperature of the ink composition. The section for which the temperature is made constant includes the whole of a piping system and all of the members from an ink tank (middle tank where it is present) to a nozzle injection face. That is, a section from an ink supply tank to an inkjet head portion can be thermally insulated and heated.

A method for temperature control is not particularly limited, and it is preferable to provide, for example, a plurality of temperature sensors at each pipe section and control heating according to ink flow rate and environmental temperature. The temperature sensors may be provided at the ink supply tank and in the vicinity of an inkjet head nozzle. Furthermore, it is preferable that a head unit that is heated is thermally shielded or insulated so that the system main body is not affected by the outside temperature. In order to reduce the printer start-up time required for heating or suppress loss of thermal energy, it is preferable to thermally insulate the heating unit from other sections and decrease the overall thermal capacity thereof.

When the ink composition of the present invention is discharged using the above mentioned inkjet recording device, the ink composition is preferably discharged after being heated to preferably 25° C. to 80° C., and more preferably 25° C. to 50° C., so as to reduce the viscosity of the ink composition to preferably 3 to 15 mPa·s, and more preferably 3 to 13 mPa·s. In particular, it is preferable to use the ink composition having an ink viscosity at 25° C. of no more than 50 mPa·s since a good discharge stability can be obtained. By employing this method, high discharge stability can be realized.

The radiation curing type ink composition such as the ink composition of the present invention generally has a viscosity that is higher than that of a normal ink composition or a water-based ink used for an inkjet recording ink, and variation in viscosity due to a change in temperature at the time of discharge is large. Viscosity variation in the ink has a large effect on changes in liquid droplet size and changes in liquid droplet discharge speed and, consequently, causes the image quality to be degraded. It is therefore necessary to maintain the ink discharge temperature as constant as possible. In the present invention, the control range for the temperature is desirably ±5° C. of a set temperature, preferably ±2° C. of the set temperature, and more preferably ±1° C. of the set temperature.

In accordance with the above-mentioned preferred discharge conditions, the ink composition of the present invention is repeatedly heated and cooled, but due to the function of amine compound (D), even if the ink composition is stored under such temperature conditions, degradation in pigment dispersion is suppressed, excellent coloration is obtained over a long period of time and degradation in discharge properties due to aggregation of pigment is suppressed, which are advantages.

The step ($b^1$) of curing the discharged ink composition by irradiating the ink composition with actinic radiation is now explained.

The ink composition discharged onto the recording medium cures upon exposure to actinic radiation. This is due to an initiating species such as a radical, an acid, or a base being generated by decomposition of the photopolymerization initiator contained in the ink composition of the present invention by irradiation with actinic radiation, the initiating species functioning so as to make a polymerization reaction of a radically polymerizable compound take place and to promote it. In this process, if a sensitizer is present together with the polymerization initiator in the ink composition, the sensitizer in the system absorbs actinic radiation, becomes excited, and promotes decomposition of the polymerization initiator by contact with the polymerization initiator, thus enabling a curing reaction with higher sensitivity to be achieved.

The actinic radiation used in this process may include α rays, γ rays, an electron beam, X rays, UV rays, visible light, and IR rays. Although it depends on the absorption characteristics of the sensitizer, the peak wavelength of the actinic radiation is, for example, 200 to 600 nm, preferably 300 to 450 nm, and more preferably 320 to 420 nm and it is more preferable that the actinic radiation is UV rays having the peak wavelength of 340 to 400 nm.

Furthermore, the polymerization initiation system of the ink composition of the present invention has sufficient sensitivity for low output actinic radiation. The actinic radiation is applied therefore so that the illumination intensity on the exposed surface is, for example, 10 to 4,000 mW/cm$^2$, and preferably 20 to 2,500 mW/cm$^2$.

As an actinic radiation source, a mercury lamp, a gas/solid laser, etc. are mainly used, and for UV photocuring inkjet a mercury lamp and a metal halide lamp are widely known. However, from the viewpoint of protection of the environment, there has recently been a strong desire for mercury not to be used, and replacement by a GaN semiconductor UV light emitting device is very useful from industrial and environmental viewpoints. Furthermore, LEDs (UV-LED) and LDs (UV-LD) have small dimensions, long life, high efficiency, and low cost, and their use as a photocuring inkjet light source can be expected.

Furthermore, light-emitting diodes (LED) and laser diodes (LD) may be used as the source of actinic radiation. In particular, when a UV ray source is needed, a UV-LED or a UV-LED may be used. For example, Nichia Corporation has marketed a violet LED having a wavelength of the main emission spectrum of between 365 nm and 420 nm. Furthermore, when a shorter wavelength is needed, U.S. Pat. No. 6,084,250 discloses an LED that can emit actinic radiation whose wavelength is centered between 300 nm and 370 nm. Furthermore, another violet LED is available, and irradiation can be carried out with radiation of a different UV bandwidth. The actinic radiation source particularly preferable in the present invention is a UV-LED, and a UV-LED having a peak wavelength at 340 to 400 nm is particularly preferable.

The maximum illumination intensity of the LED on a recording medium is preferably 10 to 2,000 $mW/cm^2$, more preferably 20 to 1,000 $mW/cm^2$, and particularly preferably 50 to 800 $mJ/cm^2$.

The ink composition of the present invention is desirably exposed to such actinic radiation for, for example, 0.01 to 120 sec., and preferably 0.1 to 90 sec.

Irradiation conditions and a basic method for irradiation with actinic radiation are disclosed in JP-A-60-132767. Specifically, a light source is provided on either side of a head unit that includes an ink discharge device, and the head unit and the light source are made to scan by a so-called shuttle system. Irradiation with actinic radiation is carried out after a certain time (e.g. 0.01 to 0.5 sec., preferably 0.01 to 0.3 sec., and more preferably 0.01 to 0.15 sec.) has elapsed from when the ink has landed. By controlling the time from ink landing to irradiation so as to be a minimum in this way, it becomes possible to prevent the ink that has landed on a recording medium from spreading before being cured. Furthermore, since the ink can be exposed before it reaches a deep area of a porous recording medium that the light source cannot reach, it is possible to prevent monomer from remaining unreacted.

Furthermore, curing may be completed using another light source that is not driven. WO99/54415 discloses, as an irradiation method, a method employing an optical fiber and a method in which a collimated light source is incident on a mirror surface provided on a head unit side face, and a recorded area is irradiated with UV light.

By employing the above-mentioned inkjet recording method, it is possible to keep the diameter of landed ink dots constant even for various recording media having different surface wettability, thus improving the image quality. In order to obtain a color image, it is preferable to overlap in order from low lightness colors. By overlapping in order from low lightness inks, it becomes easy for radiation to reach ink in a lower part, and good curing sensitivity, reduction of residual monomer, and improvement in adhesion can be expected. Although it is possible to carry out irradiation all at once after all colors are discharged, it is preferable in terms of promoting curing that exposure to light is carried out for each color.

In this way, the ink composition of the present invention cures with high sensitivity upon exposure to actinic radiation, and a hydrophobic image is formed on the surface of a recording medium.

The inkjet recording method of the present invention may suitably employ the ink set comprising the ink composition of the present invention. The order in which colored ink compositions are discharged is not particularly limited, but it is preferable to apply to a recording medium from a colored ink composition having a low lightness; when yellow, cyan, magenta, and black ink compositions are used, they are preferably applied on top of the recording medium in the order yellow→cyan→magenta→black. Furthermore, when white is additionally used, they are preferably applied on top of the recording medium in the order white→yellow→cyan→magenta→black. Moreover, the present invention is not limited thereto, and an ink set comprising a total of eight colors, that is, light cyan, light magenta, and light black ink compositions and cyan, magenta, black, white, and yellow dark ink compositions may preferably be used, and in this case they are applied on top of the recording medium in the order white→light cyan→light magenta→light black→yellow→cyan→magenta→black.

In the present invention, the recording medium is not particularly limited, and a recording medium known as a support or a recording material may be used. Examples thereof include paper, paper laminated with a plastic (e.g. polyethylene, polypropylene, polystyrene, etc.), a metal plate (e.g. aluminum, zinc, copper, etc.), a plastic film (e.g. cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, polyvinylacetal, etc.), and paper or plastic film laminated or vapor-deposited with the above metal. In the present invention, as the recording medium, a non-absorbing recording medium may suitably be used.

As described above, since it is desirable for the radiation curing type ink to be discharged at a constant temperature, a section from the ink supply tank to the inkjet head is thermally insulated and heated. A method of controlling temperature is not particularly limited, but it is preferable to provide, for example, temperature sensors at a plurality of pipe section positions, and control heating according to the ink flow rate and the temperature of the surroundings. The temperature sensors may be provided on the ink supply tank and in the vicinity of the inkjet head nozzle. Furthermore, the head unit that is to be heated is preferably thermally shielded or insulated so that the device main body is not influenced by the temperature of the outside air. In order to reduce the printer start-up time required for heating, or in order to reduce the thermal energy loss, it is preferable to thermally insulate the head unit from other sections and also to reduce the heat capacity of the entire heated unit.

As a light source emitting a light having a wave length of at least 340 nm to 400 nm, it is not limited, but a commercial UV light source can be used preferably. Examples of the commercial UV light source include a mercury lamp, a mercury lamp, a metal halide lamp, LEDs (UV-LED), LDs (UV-LD) and a UV cathode tube, and LEDs can be used preferably because it has small dimensions, long life, high efficiency, and low cost.

Application of the photocurable composition of the present invention is not limited thereto, and it may be applied to paints, varnishes, powder coatings, printing plates, adhesives, dental compositions, gel coats, electronic photoresists (e.g. electroplating resists, etching resists), compositions for producing soldering resists, compositions for producing color filters for use in various types of display devices, compositions for forming structures in processes for producing plasma display, panels, electroluminescent display devices, and LCDs, composite compositions, resists such as photoresists, color filter materials, black matrixes, compositions for sealing electric and electronic components, magnetic recording materials, micromechanical components, waveguides, optical switches, plating masks, etching masks, color test systems, glass fiber cable coatings, compositions for producing screen printing stencils, compositions for producing three-dimensional materials by stereolithography, image recording materials, in particular image recording materials for holographic recording, microelectronic circuits, compositions as decolorant materials for image recording materials employing microcapsules, and compositions for forming a dielectric layer in sequential lamination of printed circuit boards.

In accordance with the present invention, there can be provided a photocurable composition that has high sensitivity to UV light, which is abundant in recent generally used exposure light sources, and that forms a cured coating causing little discoloration or exudation of a non-curing component, and a process for producing a photocured material employing same.

In particular, there can be provided a photocurable composition and a process for producing a photocured material that are suitable as an ink composition for photocuring inkjet recording and an inkjet recording method.

EXAMPLES

The present invention is explained in detail below by reference to Examples, but the present invention is not limited thereto.

Preparation of Pigment Dispersion

The components shown in Table 1 were mixed, and stirred using a stirrer for 1 hour. After stirring, the mixture was dispersed by means of bead mill dispersion, thus giving a pigment dispersion. Dispersion was carried out under conditions of 0.65 mm diameter zirconia beads packed at a packing ratio of 70%, a peripheral speed of 9 m/s, and a dispersion time of 2 to 4 hours.

TABLE 1

| | Cyan pigment A (Parts by weight) | Magenta pigment A (Parts by weight) | Yellow pigment A (Parts by weight) | Carbon black (Parts by weight) | Titanium dioxide (Parts by weight) | Dispersant A (Parts by weight) | Dispersant B (Parts by weight) | Polymerizable compound A (Parts by weight) |
|---|---|---|---|---|---|---|---|---|
| Cyan pigment dispersion A | 30 | — | — | — | — | 20 | — | 50 |
| Magenta pigment dispersion A | — | 30 | — | — | — | 20 | — | 50 |
| Yellow pigment dispersion A | — | — | 30 | — | — | 20 | — | 50 |
| Black pigment dispersion A | — | — | — | 40 | — | 25 | — | 35 |
| White pigment dispersion A | — | — | — | — | 60 | — | 5 | 35 |

The pigments, dispersants, and polymerizable compound shown in Table 1 are as follows.
Cyan pigment A: PB 15:3 (IRGALITE BLUE GLO; manufactured by Ciba Specialty Chemicals)
Magenta pigment A: PV 19 (CINQUASIA MAGENTA RT-355D; manufactured by Ciba Specialty Chemicals)
Yellow pigment A: PY 155 (NOVOPERM YELLOW 4G-01; manufactured by Clariant)
Carbon black: SPECIAL BLACK 250 (manufactured by Degussa)
Titanium oxide: CR 60-2 (manufactured by Ishihara Sangyo Kaisha Ltd.)
Dispersant A: BYK-168 (manufactured by BYK-Chemie)
Dispersant B: Solsperse 36000 (manufactured by Noveon)
Polymerizable compound A: PEA (phenoxyethyl acrylate; manufactured by Dai-ichi Kogyo Seiyaku Co., Ltd.)

Preparation of Ink Composition

The components shown in Table 2 to Table 7 (units: parts by weight) were stirred, mixed, and dissolved to give ink compositions. The surface tension of these ink compositions was measured at a liquid temperature of 25° C. by the Wilhelmy method using a surface tensiometer (e.g. a CBVP-Z surface tensiometer manufactured by Kyowa Interface Science Co., Ltd.). Values measured for the surface tension of the ink compositions were all in the range of 23 to 25 mN/m.

TABLE 2

| Composition | Ink composition | | | | |
|---|---|---|---|---|---|
| (Parts by weight) | M1 | C1 | Y1 | W1 | Bk1 |
| Magenta pigment dispersion A | 18 | — | — | — | — |
| Cyan pigment dispersion A | — | 7 | — | — | — |
| Yellow pigment dispersion A | — | — | 15 | — | — |
| White pigment A | — | — | — | 9.6 | — |
| Black pigment A | — | — | — | — | 9 |
| Polymerizable compound A | 16.3 | 27.3 | 19.3 | 24.7 | 25.3 |
| Polymerizable compound B | 30 | 30 | 30 | 30 | 30 |
| Polymerizable compound C | 1 | 1 | 1 | 1 | 1 |
| Polymerizable compound D | 15 | 15 | 15 | 15 | 15 |
| Surfactant A | 0.1 | 0.1 | 0.1 | 0.1 | 0.1 |
| Amine compound A | 1 | 1 | 1 | 1 | 1 |
| Inhibitor A | 0.1 | 0.1 | 0.1 | 0.1 | 0.1 |
| Initiator A | 4.5 | 4.5 | 4.5 | 4.5 | 4.5 |
| Initiator B | 4 | 4 | 4 | 4 | 4 |

TABLE 2-continued

| Composition | Ink composition | | | | |
|---|---|---|---|---|---|
| (Parts by weight) | M1 | C1 | Y1 | W1 | Bk1 |
| Initiator C | 2 | 2 | 2 | 2 | 2 |
| Sensitizer A | 8 | 8 | 8 | 8 | 8 |

TABLE 3

| Composition | Ink composition | | | | |
|---|---|---|---|---|---|
| (Parts by weight) | M2 | C2 | Y2 | W2 | Bk2 |
| Magenta pigment dispersion A | 18 | — | — | — | — |
| Cyan pigment dispersion A | — | 7 | — | — | — |
| Yellow pigment | — | — | 15 | — | — |

TABLE 3-continued

| Composition (Parts by weight) | Ink composition | | | | |
|---|---|---|---|---|---|
| | M2 | C2 | Y2 | W2 | Bk2 |
| dispersion A | | | | | |
| White pigment dispersion A | — | — | — | 9.6 | — |
| Black pigment dispersion A | — | — | — | — | 9 |
| Polymerizable compound A | 31.3 | 42.3 | 34.3 | 39.7 | 40.3 |
| Polymerizable compound B | 30 | 30 | 30 | 30 | 30 |
| Polymerizable compound C | 1 | 1 | 1 | 1 | 1 |
| Surfactant A | 0.1 | 0.1 | 0.1 | 0.1 | 0.1 |
| Amine compound B | 1 | 1 | 1 | 1 | 1 |
| Inhibitor A | 0.1 | 0.1 | 0.1 | 0.1 | 0.1 |
| Initiator A | 4.5 | 4.5 | 4.5 | 4.5 | 4.5 |
| Initiator B | 4 | 4 | 4 | 4 | 4 |
| Initiator C | 2 | 2 | 2 | 2 | 2 |
| Sensitizer B | 8 | 8 | 8 | 8 | 8 |

TABLE 4

| Composition (Parts by weight) | Ink composition | | | | |
|---|---|---|---|---|---|
| | M3 | C3 | Y3 | W3 | Bk3 |
| Magenta pigment dispersion A | 18 | — | — | — | — |
| Cyan pigment dispersion A | — | 7 | — | — | — |
| Yellow pigment dispersion A | — | — | 15 | — | — |
| White pigment dispersion A | — | — | — | 9.6 | — |
| Black pigment dispersion A | — | — | — | — | 9 |
| Polymerizable compound A | 31.3 | 42.3 | 34.3 | 39.7 | 40.3 |
| Polymerizable compound B | 30 | 30 | 30 | 30 | 30 |
| Polymerizable compound C | 1 | 1 | 1 | 1 | 1 |
| Surfactant A | 0.1 | 0.1 | 0.1 | 0.1 | 0.1 |
| Amine compound C | 1 | 1 | 1 | 1 | 1 |
| Inhibitor A | 0.1 | 0.1 | 0.1 | 0.1 | 0.1 |
| Initiator A | 4.5 | 4.5 | 4.5 | 4.5 | 4.5 |
| Initiator B | 4 | 4 | 4 | 4 | 4 |
| Initiator C | 2 | 2 | 2 | 2 | 2 |
| Sensitizer A | 8 | 8 | 8 | 8 | 8 |

TABLE 5

| Composition (Parts by weight) | Ink composition | | | | |
|---|---|---|---|---|---|
| | M4 | C4 | Y4 | W4 | Bk4 |
| Magenta pigment dispersion A | 18 | — | — | — | — |
| Cyan pigment dispersion A | — | 7 | — | — | — |
| Yellow pigment dispersion A | — | — | 15 | — | — |
| White pigment dispersion A | — | — | — | 9.6 | — |
| Black pigment dispersion A | — | — | — | — | 9 |
| Polymerizable compound A | 39.3 | 50.3 | 42.3 | 47.7 | 48.3 |
| Polymerizable compound B | 30 | 30 | 30 | 30 | 30 |
| Polymerizable compound C | 1 | 1 | 1 | 1 | 1 |
| Surfactant A | 0.1 | 0.1 | 0.1 | 0.1 | 0.1 |
| Amine compound A | 1 | 1 | 1 | 1 | 1 |
| Inhibitor A | 0.1 | 0.1 | 0.1 | 0.1 | 0.1 |
| Initiator A | 4.5 | 4.5 | 4.5 | 4.5 | 4.5 |
| Initiator B | 4 | 4 | 4 | 4 | 4 |
| Initiator C | 2 | 2 | 2 | 2 | 2 |

TABLE 6

| Composition (Parts by weight) | Ink composition | | | | |
|---|---|---|---|---|---|
| | M5 | C5 | Y5 | W5 | Bk5 |
| Magenta pigment dispersion A | 18 | — | — | — | — |
| Cyan pigment dispersion A | — | 7 | — | — | — |
| Yellow pigment dispersion A | — | — | 15 | — | — |
| White pigment dispersion A | — | — | — | 9.6 | — |
| Black pigment dispersion A | — | — | — | — | 9 |
| Polymerizable compound A | 32.3 | 43.3 | 35.3 | 40.7 | 41.3 |
| Polymerizable compound B | 30 | 30 | 30 | 30 | 30 |
| Polymerizable compound C | 1 | 1 | 1 | 1 | 1 |
| Surfactant A | 0.1 | 0.1 | 0.1 | 0.1 | 0.1 |
| Inhibitor A | 0.1 | 0.1 | 0.1 | 0.1 | 0.1 |
| Initiator A | 4.5 | 4.5 | 4.5 | 4.5 | 4.5 |
| Initiator B | 4 | 4 | 4 | 4 | 4 |
| Initiator C | 2 | 2 | 2 | 2 | 2 |
| Sensitizer A | 8 | 8 | 8 | 8 | 8 |

TABLE 7

| Composition (Parts by weight) | Ink composition | | | | |
|---|---|---|---|---|---|
| | M6 | C6 | Y6 | W6 | Bk6 |
| Magenta pigment dispersion A | 18 | — | — | — | — |
| Cyan pigment dispersion A | — | 7 | — | — | — |
| Yellow pigment dispersion A | — | — | 15 | — | — |
| White pigment dispersion A | — | — | — | 9.6 | — |
| Black pigment dispersion A | — | — | — | — | 9 |
| Polymerizable compound A | 31.3 | 42.3 | 34.3 | 39.7 | 40.3 |
| Polymerizable compound B | 30 | 30 | 30 | 30 | 30 |
| Polymerizable compound C | 1 | 1 | 1 | 1 | 1 |
| Surfactant A | 0.1 | 0.1 | 0.1 | 0.1 | 0.1 |
| Amine compound A | 1 | 1 | 1 | 1 | 1 |
| Inhibitor A | 0.1 | 0.1 | 0.1 | 0.1 | 0.1 |
| Initiator D | 5.5 | 5.5 | 5.5 | 5.5 | 5.5 |
| Initiator E | 5 | 5 | 5 | 5 | 5 |
| Sensitizer A | 8 | 8 | 8 | 8 | 8 |

The polymerizable compounds, surfactant, inhibitor (polymerization inhibitor), initiators (photopolymerization initiators), amine compounds, and sensitizers (compound (I)) used in Table 2 to Table 7 are shown below.

Polymerizable compound A: PEA (phenoxyethyl acrylate; manufactured by Dai-ichi Kogyo Seiyaku Co., Ltd.)
Polymerizable compound B: DPGDA (dipropylene glycol diacrylate; manufactured by Daicel-Cytec Company Ltd.)
Polymerizable compound C: A-TMPT (trimethylolpropane triacrylate; manufactured by Shin-Nakamura Chemical Co., Ltd.)
Polymerizable compound D: FA-512A (dicyclopentenyloxyethyl acrylate; manufactured by Shin-Nakamura Chemical Co., Ltd.)
Surfactant A: BYK-307 (manufactured by BYK-Chemie, surfactant)
Inhibitor A: FIRSTCURE ST-1 (manufactured by Albemarle)
Initiator A: bis(2,4,6-trimethylbenzoyl)phenylphosphine oxide (acylphosphine oxide)
Initiator B: 2,4,6-trimethylbenzoyldiphenylphosphine oxide
Initiator C: 2-methyl-1-(4-methylthiophenyl)-2-morpholino-propan-1-one
Initiator D: 1-hydroxycyclohexyl phenyl ketone
Initiator E: 1-[4-(2-hydroxyethoxy)phenyl]-2-hydroxy-2-methyl-1-propan-1-one
Amine compound A: compound (A-1) below
Amine compound B: compound (A-2) below
Amine compound C: N,N-dimethylaminoethyl acrylate
Compound (I)-1 (sensitizer A): compound (B-1) below
Compound (I)-2 (sensitizer B): compound (B-2) below

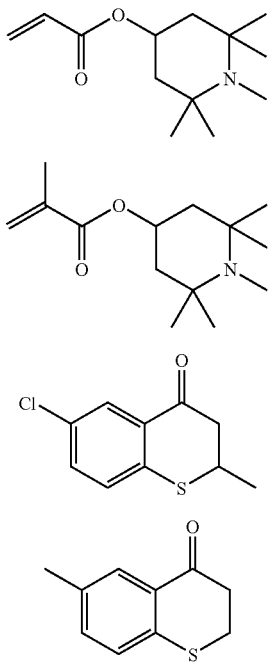

Inkjet Recording Device

An inkjet printer (equipped with heads manufactured by Toshiba Tec Corporation having a droplet firing frequency of 6.2 KHz, a number of nozzles of 636, a nozzle density of 300 npi (nozzles/inch, the same applies below), and a drop size variable in 7 stages from 6 pL to 42 pL with two heads arranged to give 600 npi, five sets of these heads being arranged in a full line as a head set) was charged with five colors of the ink compositions (M1 to M6, C1 to C6, Y1 to Y6, Bk1 to Bk6, and W1 to W6) prepared above.

The construction was such that a recording medium was able to move immediately-beneath the head, and the heads were fixed to a machine body in the order white, yellow, cyan, magenta, and black from upstream in the transport direction of the recording medium.

Five metal halide lamps (light intensity 3,000 mW/cm$^2$) were installed downstream of the black ink head. The irradiation energy of the metal halide lamps could be adjusted from 300 to 1,500 mJ/cm$^2$ by the number of metal halide lamps that were switched ON. Specifically, 300 mJ/cm$^2$ (1 lamp ON), 600 mJ/cm$^2$ (2 lamps ON), 900 mJ/cm$^2$ (3 lamps ON), 1,200 mJ/cm$^2$ (4 lamps ON), and 1,500 mJ/cm$^2$ (5 lamps ON). The light emission spectrum of the metal halide lamp was as shown in FIG. 1, and it was confirmed that it emitted sufficient light in the wavelength range of 340 nm to 400 nm. Furthermore, the light emission peak wavelength (wavelength having maximum light emission intensity) of the metal halide lamp used in the Examples was in the wavelength range of 340 nm to 400 nm.

The recording medium was transported by roll transfer, and a 600 dpi×600 dpi image was formed on a recording medium. As the recording medium, plastic film A (white polyethylene) and plastic film B (transparent polyethylene) were used. They were subjected to a corona discharge treatment before printing so that the surface energy of the substrate was no greater than 30 mN/m.

Example 1

An image was formed on a plastic film (white polyethylene) using the above-mentioned image recording system in accordance with the procedure described below, thus giving a printed material.

(1) A white ink composition (W1) was applied using the white head on top of the recording medium, thus forming a white image.

(2) A yellow ink composition (Y1) was applied using the yellow head on top of the recording medium, thus forming a yellow image.

(3) A cyan ink composition (C1) was applied using the cyan head on top of the recording medium, thus forming a cyan image.

(4) A magenta ink composition (M1) was applied using the magenta head on top of the recording medium, thus forming a magenta image.

(5) A black ink composition (Bk1) was applied using the black head on top of the recording medium, thus forming a black image (6) Exposure to light was carried out using the metal halide lamps (light intensity 3,000 mW/cm$^2$), thus completely curing the image. The exposure energy was adjusted from 300 to 1,500 mJ/cm$^2$ by the number of metal halide lamps switched ON.

The transport speed for the recording medium here was 400 mm/s, and the amount of ink composition per dot was about 12 pL.

Examples 2 and 3 and Comparative Examples 1 to 3

A recorded material (image) was formed in the same manner as in Example 1 except that the ink compositions were changed as described in Table 8.

Evaluation Items
Curability (Tack-free Sensitivity) Test

Curability was defined as the exposure energy at which tackiness on the printed surface disappeared.

The presence or absence of tackiness of the printed surface was determined by pressing plain paper (Photocopy paper C2, manufactured by Fuji Xerox Co., Ltd.) thereagainst immediately after printing; when the ink composition transferred, tackiness was present, and when there was no transfer, tackiness was absent.

The exposure energy was changed between 300 mJ/cm², 600 mJ/cm², 900 mJ/cm², 1,200 mJ/cm², and 1,500 mJ/cm², and evaluation was carried out in accordance with the criteria below.

Figure 2:
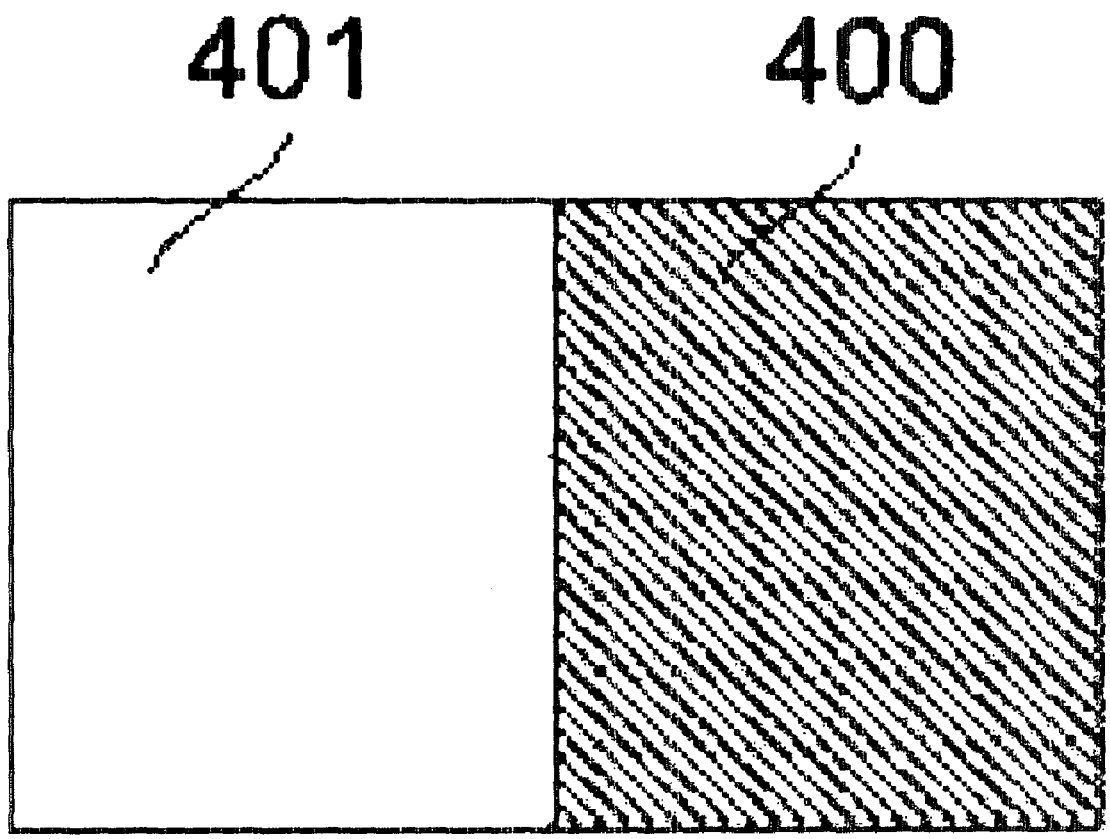
[FIG. 2] Printed material A formed in the Examples.

The curability was evaluated using printed material A (FIG. 2). In FIG. 2, 400 denotes a solid printed area formed using a primary color (cyan, magenta, yellow, black, or white), and a primary color solid image was printed at a pixel density of 600×600 dpi by applying a 12 pL liquid droplet of the ink composition per pixel. 401 denotes an area where no ink composition was applied, and the substrate was exposed on the surface.

Evaluation was carried out using the five gradings below.
5: No tackiness observed with exposure at 300 mJ/cm².
4: No tackiness observed with exposure at 600 mJ/cm².
3: No tackiness observed with exposure at 900 mJ/cm².
2: No tackiness observed with exposure at 1200 mJ/cm².
1: No tackiness observed with exposure at 1500 mJ/cm².

The results of the curability test are given in Table 8. The lower the tack-free sensitivity, the more preferable from the viewpoint of curability, and it is particularly preferable that it is no greater than 600 mJ/cm² (evaluated as 5 or 4). With regard to Example 1 to Example 3 and Comparative Example 1 to Comparative Example 3, the same evaluation was obtained for all primary colors in each case. The same results were obtained for plastic film A and plastic film B.

Blocking Test

A printed surface and a substrate surface were superimposed, after a fixed period of time had elapsed they were peeled apart, and the presence of tearing of the coating on the printed surface or transfer to the substrate surface was evaluated.

All of the printed materials used in the blocking test were exposed at an exposure energy of 1,500 mJ/cm² in the curability (tack-free sensitivity) test. When storing the printed material, the printed surface and the substrate surface were superimposed, and a uniform load (1 kg/cm²) was applied to the entire printed material using a weight at room temperature for 24 hours (kept in a thermostatted bath at 45° C.). After 24 hours had elapsed, the printed surface and the substrate surface were peeled apart, and a visual evaluation was made in accordance with the criteria below.

Evaluation was carried out using the three gradings below.
3: No tearing of the coating on the printed surface, and no transfer of ink to the substrate surface.
2: Tearing or internal failure of the coating was observed in part of the printed surface or transfer of ink to the substrate surface was observed in part (the 'part' referred to here means less than 50% of the entire area)
1: Tearing or internal failure of the coating was observed in the whole area of the printed surface or transfer of ink to the substrate surface was observed in the whole area (the 'whole area' referred to here means at least 50% of the entire area)

The results of the blocking test are given in Table 8. Here, from the viewpoint of curability, it is preferable that there is no tearing in the coating on the printed surface or transfer to the substrate surface, and only criterion 3 is acceptable.

With regard to Example 1 to Example 3 and Comparative Example 1 to Comparative Example 3, the same evaluation was obtained for all primary colors in each case.

TABLE 8

|  | Ex. 1 | Ex. 2 | Ex. 3 | Comp. Ex. 1 | Comp. Ex. 2 | Comp. Ex. 3 |
|---|---|---|---|---|---|---|
|  | Ink set | | | | | |
|  | 1 | 2 | 3 | 4 | 5 | 6 |
| Magenta head | M1 | M2 | M3 | M4 | M5 | M6 |
| Cyan head | C1 | C2 | C3 | C4 | C5 | C6 |
| Yellow head | Y1 | Y2 | Y3 | Y4 | Y5 | Y6 |
| White head | W1 | W2 | W3 | W4 | W5 | W6 |
| Black head | Bk1 | Bk2 | Bk3 | Bk4 | Bk5 | Bk6 |
| Curability test | 5 | 4 | 5 | 2 | 4 | 1 |
| Blocking test | 3 | 3 | 3 | 2 | 1 | 1 |

This suggests that, in order to obtain a preferred curability (irradiation energy to make tackiness disappear is no greater than 600 mJ/cm²), it is necessary to use in combination a specific compound represented by Formula (I) above and a specific initiator (acylphosphine oxide-based or α-aminoketone-based initiator) (Examples 1 to 3, Comparative Example 2).

However, it has been found that, when no amine compound was added, although curability was good, blocking was degraded in the storage test of the printed material at 45° C. (Comparative Example 2).

It is clear from the above that, in order to give good curability and form an image causing no blocking, it is effective to add a specific compound represented by Formula (I) above, a specific initiator (acylphosphine oxide-based or α-aminoketone-based initiator), and an amine compound.

The invention claimed is:

1. A photocurable composition comprising:
   a polymerizable compound;
   a photopolymerization initiator;
   a compound represented by Formula (I) below; and
   an amine compound having an ethylenically unsaturated bond in the molecule,
   the photopolymerization initiator comprising an acylphosphine oxide compound and/or an α-aminoacetophenone compound:

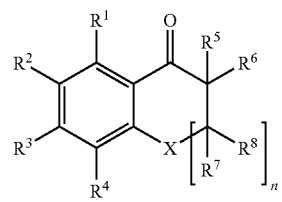

(I)

wherein in Formula (I), X denotes O, S, or NR, n denotes 0 or 1, R denotes a hydrogen atom, an alkyl group, or an acyl group, $R^1$, $R^2$, $R^3$, $R^4$, $R^5$, $R^6$, $R^7$, and $R^8$ independently denote a hydrogen atom or a monovalent substituent, and two of $R^1$, $R^2$, $R^3$, and $R^4$ that are adjacent may be bonded to each other to form a ring.

2. The photocurable composition according to claim 1, wherein the amine compound is a tertiary amine compound.

3. A process for producing a photocured material, comprising:
   a step of preparing the photocurable composition according to claim 1; and
   a step of irradiating the photocurable composition with light having a light emission peak in the range of at least 340 nm but no greater than 400 nm.

4. The photocurable composition according to claim 1, wherein the amine compound is a compound having a cyclic amine structure in the molecule.

5. The photocurable composition according to claim 1, wherein the amine compound is a compound represented by Formula (2), (3), or (4) below

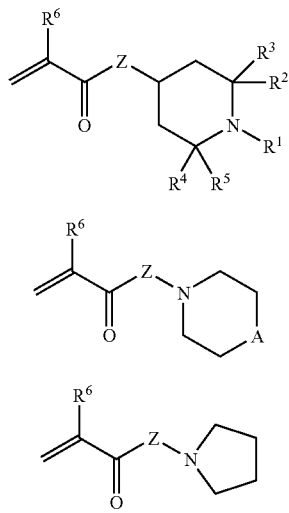

in Formulae (2) to (4), $R^1$ denotes an alkyl group, $R^2$ to $R^5$ denote a methyl group or an ethyl group, $R^6$ denotes a methyl group or a hydrogen atom, Z denotes a divalent linking group or a single bond, and A denotes a divalent organic group.

6. The photocurable composition according to claim 1, wherein the polymerizable compound comprises a monofunctional polymerizable monomer having an alicyclic structure and/or an aromatic monofunctional radically polymerizable monomer.

7. The photocurable composition according to claim 1, wherein the polymerizable compound comprises a compound represented by Formula (A3) below and/or a compound represented by Formula (A4)

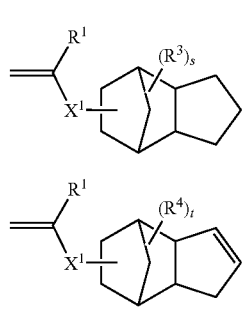

in Formula (A3) and Formula (A4), $R^1$ denotes a hydrogen atom, a halogen atom, or an alkyl group having 1 to 4 carbons, $X^1$ denotes a divalent linking group, $R^3$ and $R^4$ independently denote a substituent, s and t independently denote an integer of 0 to 5, and the s $R^3$s and the t $R^4$s may be identical to or different from each other.

8. The photocurable composition according to claim 1, wherein the polymerizable compound comprises a compound represented by Formula (A5) below

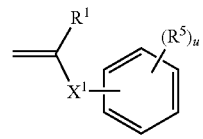

in Formula (A5), $R^1$ denotes a hydrogen atom, a halogen atom, or an alkyl group having 1 to 4 carbons, $X^1$ denotes a divalent linking group, $R^6$ denotes a substituent, u denotes an integer of 0 to 5 and, furthermore, the u $R^5$s may be identical to or different from each other and a plurality of the $R^5$s may be bonded to each other to form a ring, which may be an aromatic ring.

9. The photocurable composition according to claim 1, wherein the acylphosphine oxide compound comprises a compound represented by Formula (2) and/or a compound represented by Formula (3)

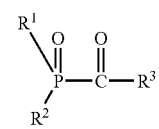

in Formula (2), $R^1$ and $R^2$ independently denote an aliphatic group, an aromatic group, an aliphatic oxy group, an aromatic oxy group, or a heterocyclic group, $R^3$ denotes an aliphatic group, an aromatic group, or a heterocyclic group, $R^1$ and $R^2$ may be bonded to form a 5-membered to 9-membered ring, and the ring structure may be a heterocycle having an oxygen atom, a nitrogen atom, a sulfur atom, etc. in the ring structure,

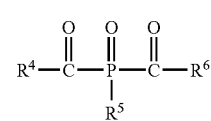

in Formula (3), $R^4$ and $R^6$ independently denote an alkyl group, an aryl group, or a heterocyclic group, and $R^5$ denotes an alkyl group, an aryl group, an alkoxy group, an aryloxy group, or a heterocyclic group.

10. The photocurable composition according to claim 1, wherein the α-aminoacetophenone compound is represented by Formula (d) below

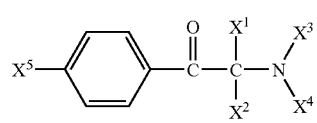

in Formula (d), $X^1$ and $X^2$ independently denote a methyl group, an ethyl group, or a benzyl group, —$NX^3X^4$ denotes a dimethylamino group, a diethylamino group, or a morpholino group, and $X^5$ denotes a hydrogen atom, an alkyl group having at least 1 but no greater than 8 carbons, an alkoxy group having at least 1 but no greater than 8 carbons, an alkylthio group having at least 1 but no greater than 8 carbons, a dimethylamino group, or a morpholino group.

11. The photocurable composition according to claim 1, wherein the compound represented by Formula (I) above is a compound represented by Formula (I-A)

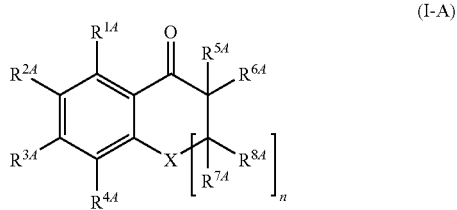

(I-A)

in Formula (I-A) above, X denotes O or S, n denotes 0 or 1, and $R^{1A}, R^{2A}, R^{3A}, R^{4A}, R^{5A}, R^{6A}, R^{7A}$, and $R^{8A}$ independently denote a hydrogen atom, a halogen atom, an alkyl group, a hydroxy group, a cyano group, a nitro group, an amino group, an alkylamino group, a dialkylamino group, an alkylthio group, an alkoxy group, an alkoxycarbonyl group, an acyloxy group, an acyl group, a carboxyl group, or a sulfo group.

12. A photocurable ink composition comprising the photocurable composition according to claim 1 and a colorant.

13. An ink composition for photocuring inkjet recording comprising the photocurable ink composition according to claim 12 wherein it is intended for use in inkjet recording.

14. An inkjet recording method comprising:
   (a) a step of discharging an ink composition onto a recording medium; and
   (b) a step of irradiating the discharged ink composition with actinic radiation so as to cure the ink composition;
   the ink composition being the ink composition according to claim 12.

15. The inkjet recording method according to claim 14, wherein the actinic radiation comprises UV rays having a light emission peak wavelength in the range of at least 340 nm but no greater than 400 nm.

* * * * *